(12) United States Patent
Yin et al.

(10) Patent No.: US 11,832,202 B2
(45) Date of Patent: Nov. 28, 2023

(54) CLOCK STATE DETECTION METHOD AND APPARATUS

(71) Applicant: HUAWEI TECHNOLOGIES CO., LTD., Shenzhen (CN)

(72) Inventors: Zhaogen Yin, Shanghai (CN); Jinli Yang, Shanghai (CN); Ziqiang Wang, Shanghai (CN); Jihong Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 203 days.

(21) Appl. No.: 17/165,685

(22) Filed: Feb. 2, 2021

(65) Prior Publication Data
US 2021/0160799 A1    May 27, 2021

Related U.S. Application Data

(63) Continuation of application No. PCT/CN2019/098660, filed on Jul. 31, 2019.

(30) Foreign Application Priority Data

Aug. 3, 2018 (CN) .................. 201810878586.X

(51) Int. Cl.
*H04W 56/00* (2009.01)
*H04L 5/14* (2006.01)
(52) U.S. Cl.
CPC ............ *H04W 56/003* (2013.01); *H04L 5/14* (2013.01); *H04W 56/001* (2013.01)

(58) Field of Classification Search
CPC ...... H04W 56/003; H04W 56/001; H04L 5/14
See application file for complete search history.

(56) References Cited

U.S. PATENT DOCUMENTS 6,567,422 B1 * 5/2003 Takeguchi ............ H04J 3/0647
370/510
9,591,498 B1    3/2017 Pearson et al.
10,257,798 B1 * 4/2019 Koelemeij .......... H04W 56/006
(Continued)

FOREIGN PATENT DOCUMENTS

CN        101154959 A    4/2008
CN        101938827 A    1/2011
(Continued)

OTHER PUBLICATIONS

Chinese Notice of Allowance dated Aug. 18, 2021 for Application No. 201810878586, 4 pages.
(Continued)

*Primary Examiner* — Bailor C Hsu

(57) ABSTRACT

This application provides a clock state detection method and apparatus, applied to the field of communications technologies, to detect clock states of M base stations. The method includes: receiving detection results of M base stations, where the detection result of each of the M base stations is used to indicate whether the base station receives a detection sequence sent by each of N neighboring stations of the base station, the N neighboring stations belong to the M base stations, both M and N are integers greater than or equal to 1, and N is less than M; and determining clock states of the M base stations based on the detection results of the M base stations.

20 Claims, 12 Drawing Sheets

(56) References Cited

U.S. PATENT DOCUMENTS

| | | | | |
|---|---|---|---|---|
| 2002/0177460 | A1* | 11/2002 | Beasley | H04B 7/2662 455/502 |
| 2005/0123082 | A1* | 6/2005 | Paul | H04B 7/0689 375/267 |
| 2006/0034250 | A1* | 2/2006 | Kim | H04B 7/2696 370/350 |
| 2009/0286564 | A1* | 11/2009 | Ho | H04W 56/00 455/502 |
| 2010/0054237 | A1* | 3/2010 | Han | H04W 56/0035 370/350 |
| 2010/0172453 | A1 | 7/2010 | Cankaya et al. | |
| 2010/0220597 | A1* | 9/2010 | Ji | H04W 16/10 370/336 |
| 2011/0007855 | A1* | 1/2011 | Ishii | H03L 7/0814 375/354 |
| 2013/0170415 | A1 | 7/2013 | Fukuta et al. | |
| 2014/0355596 | A1* | 12/2014 | Juncker | H04W 56/0035 370/350 |
| 2015/0208369 | A1* | 7/2015 | Chiueh | H04W 56/0015 370/350 |
| 2015/0373494 | A1* | 12/2015 | Van Rijn | H04L 5/0048 455/456.1 |
| 2017/0156120 | A1* | 6/2017 | Kopetz | H04W 56/00 |
| 2019/0028983 | A1* | 1/2019 | Mackenzie | H04W 56/001 |
| 2019/0079195 | A1* | 3/2019 | Chandrasekar | G01S 19/06 |
| 2022/0369223 | A1* | 11/2022 | Newman | H04W 48/16 |

FOREIGN PATENT DOCUMENTS

| | | |
|---|---|---|
| CN | 102149186 A | 8/2011 |
| CN | 202160283 U | 3/2012 |
| CN | 104168639 A | 11/2014 |
| CN | 104811988 A | 7/2015 |
| EP | 1206849 B1 | 11/2005 |
| EP | 1833178 B1 | 6/2013 |
| JP | 2004297527 A | 10/2004 |
| WO | 2001015340 A1 | 3/2001 |

OTHER PUBLICATIONS

Hu Yueming et al.,"Adjacent Frequency Interference Between IMT-2000 FDD and TDD Base Stations", Guangdong Communication Technology, vol. 22 No. 11, Nov. 2002, with an English abstract, total 6 pages.
IEEE 1588V2, IEEE Std 1588-2008 (Revision of IEEE Std 1588-2002), IEEE Standard for a Precision Clock Synchronization Protocol for Networked Measurement and Control Systems, IEEE Instrumentation and Measurement Society, Technical Committee on Sensor Technology (TC-9), dated Jul. 24, 2008, total 289 pages.
Office Action issued in CN 201810878586, dated Feb. 2, 2021, total 7 pages.
International Search Report and Written Opinion issued in PCT/CN2019/098660, dated Nov. 8, 2019, total 10 pages.
Samsung, Text proposal for a new Extended SYNC_DL Sequence for Node B Synchronisation for 1.28Mcps TDD. 3GPP TSG-RAN3#27 Meeting, Orlando, USA, Feb. 18-22, 2002, R3-020309, 26 pages.
European Search Report for Application No. 19844127.1 dated Jul. 22, 2021, 16 pages.
Japanese Notice of Allowance for Application No. 2021-505872, 3 pages.
3GPP TS 25.402 V15.0.0 (Jun. 2018), 3rd Generation Partnership Project; Technical Specification Group Radio Access Network; Synchronisation in UTRAN Stage 2(Release 15), 51 pages.
Korean Notice of Allowance dated Sep. 20, 2022 for Application No. 952002071302418, 4 pages.

* cited by examiner

CLOCK STATE DETECTION METHOD AND APPARATUS

CROSS-REFERENCE TO RELATED APPLICATIONS

This application is a continuation of International Application No. PCT/CN2019/098660, filed on Jul. 31, 2019, which claims priority to Chinese Patent Application No. 201810878586.X, filed on Aug. 3, 2018. The disclosures of the aforementioned applications are hereby incorporated by reference in their entireties.

TECHNICAL FIELD

This application is applied to the field of communications technologies, and in particular, to a clock state detection method and apparatus.

BACKGROUND

A time division duplex (time division duplex, TDD) system is a system that strictly requires clocks of base stations to keep synchronous. If a clock of a base station is not synchronized with a clock of another base station, for example, out-of-synchronization or a severe deviation occurs, downlink data of the base station may interfere with uplink data of the another base station, and downlink data of the another base station may also interfere with uplink data of the base station. Consequently, service experience is severely affected. A fault of an external clock source or a fault of an internal clock system of a base station may cause a clock state of the base station to change from synchronization to out-of-synchronization or deviation. How to determine a clock state of a base station becomes an urgent problem to be resolved.

SUMMARY

This application provides a clock state detection method and apparatus, to detect a clock state of a base station.

According to a first aspect, this application provides a clock state detection method. The method includes: receiving detection results of M base stations, where the detection result of each of the M base stations is used to indicate whether the base station receives a detection sequence sent by each of N neighboring stations of the base station, the N neighboring stations belong to the M base stations, both M and N are integers greater than or equal to 1, and N is less than M; and determining clock states of the M base stations based on the detection results of the M base stations.

According to the method provided in this application, the clock states of the M base stations across an entire network can be analyzed. In addition, the clock states of the M base stations may be detected before mutual interference occurs among the M base stations due to clock non-synchronization, to identify the clock states of the M base stations across the entire network in advance to perform troubleshooting, warning, and rectification in advance, thereby ensuring normal running of services of the base stations and user experience of UE. In addition, according to the method provided in this application, the clock states of the M base stations across the entire network may be obtained through analysis in a relatively short time, so that it is unnecessary to separately determine clock states of interfered base stations one by one, thereby improving efficiency of monitoring the clock states of the base stations.

Optionally, the method further includes: sending one piece of indication information to each of the M base stations, where the indication information is used to indicate, to the base station, N first time points at which the N neighboring stations of the base station send the detection sequences, and for each of the N neighboring stations, when the base station detects the detection sequence at the first time point at which the neighboring station sends the detection sequence, the base station receives the detection sequence from the neighboring station.

Optionally, an uplink of each of the M base stations is not interfered with by downlinks of the N neighboring stations of the base station.

In this optional implementation, a clock state of each base station can be detected in advance before the base station is interfered, to perform troubleshooting, warning, and rectification in advance, thereby ensuring normal running of a service of the base station.

Optionally, the determining clock states of the M base stations based on the detection results of the M base stations includes:

grouping the M base stations into at least one group based on the detection results of the M base stations, where for each of the at least one group, if the group includes at least two base stations, each base station in the group receives a detection sequence sent by at least one other base station in the group, or a detection sequence sent by each base station in the group is received by at least one other base station in the group; and if the group includes one base station, the one base station does not receive a detection sequence sent by each neighboring station of the one base station, or a detection sequence sent by the one base station is not received by any neighboring station of the one base station; and determining a group, in the at least one group, including base stations whose quantity is greater than or equal to a preset threshold as a synchronization group, or when a quantity of base stations included in each of the at least one group is less than the threshold, determining a group, in the at least one group, including a largest quantity of base stations as the synchronization group, where a clock state of each base station in the synchronization group is a synchronization state.

Optionally, the determining clock states of the M base stations based on the detection results of the M base stations further includes: determining, based on an out-of-synchronization condition, whether an out-of-synchronization group other than the synchronization group exists in the at least one group, where a clock state of each base station in the out-of-synchronization group is an out-of-synchronization state.

Optionally, the determining, based on an out-of-synchronization condition, whether an out-of-synchronization group other than the synchronization group exists in the at least one group includes: for any group other than the synchronization group in the at least one group, if one base station in the group meets the out-of-synchronization condition, the group is an out-of-synchronization group.

In this optional implementation, one or more base stations whose clock states are the out-of-synchronization state can be detected, to locate a faulty base station and a faulty clock source, and perform maintenance in a timely manner, thereby ensuring normal running of a service of the base station, and ensuring user experience of the UE.

According to a second aspect, this application provides a clock state detection method. The method includes: A base station receives indication information, where the indication information is used to indicate N first time points at which N neighboring stations of the base station sequentially send detection sequences, and N is an integer greater than or equal to 1; the base station detects the detection sequences at the N first time points, where for each of the N neighboring stations, when the base station detects the detection sequence at the first time point at which the neighboring station sends the detection sequence, the base station determines that the detection sequence from the neighboring station is received; and the base station sends a detection result, where the detection result is used to indicate whether the base station receives the detection sequence sent by each of the N neighboring stations, to determine a clock state of the base station.

According to the method provided in this application, each of M base stations detects the detection sequence from each of the N neighboring stations of the base station under the control of the indication information, to obtain the detection result. In this way, clock states of the M base stations across an entire network can be analyzed. In addition, the clock states of the M base stations may be detected before mutual interference occurs among the M base stations due to clocknon-synchronization, to identify the clock states of the M base stations across the entire network in advance to perform troubleshooting, warning, and rectification in advance, thereby ensuring normal running of services of the base stations and user experience of UE. In addition, according to the method provided in this application, the clock states of the M base stations across the entire network may be obtained through analysis in a relatively short time, so that it is unnecessary to separately determine clock states of interfered base stations one by one, thereby improving efficiency of monitoring the clock states of the base stations.

Optionally, the indication information is further used to indicate a second time point at which the base station sends a detection sequence; and the base station sends the detection sequence at the second time point.

According to a third aspect, an embodiment of this application provides an apparatus. The apparatus may be a network device, a chip in a network device, a base station, or a chip in a base station. The apparatus has a function of implementing the method according to the first aspect. The function may be implemented by hardware, or may be implemented by hardware executing corresponding software. The hardware or the software includes one or more modules corresponding to the foregoing function. The apparatus includes a processing unit and a communications unit. Optionally, the apparatus may further include a storage unit. The processing unit may receive or send information by using the communications unit, and the processing unit may process the information, so that the apparatus implements the method according to the first aspect.

The processing unit is configured to receive detection results of M base stations by using the communications unit, and determine clock states of the M base stations based on the detection results of the M base stations. The detection result of each of the M base stations is used to indicate whether the base station receives a detection sequence sent by each of N neighboring stations of the base station. The N neighboring stations belong to the M base stations. Both M and N are integers greater than or equal to 1, and N is less than M.

Optionally, the processing unit is further configured to send one piece of indication information to each of the M base stations by using the communications unit. The indication information is used to indicate, to the base station, N first time points at which the N neighboring stations of the base station send the detection sequences. For each of the N neighboring stations, when the base station detects the detection sequence at the first time point at which the neighboring station sends the detection sequence, the base station receives the detection sequence from the neighboring station.

Optionally, that the processing unit is configured to determine clock states of the M base stations based on the detection results of the M base stations specifically includes:

grouping the M base stations into at least one group based on the detection results of the M base stations, where for each of the at least one group, if the group includes at least two base stations, each base station in the group receives a detection sequence sent by at least one other base station in the group, or a detection sequence sent by each base station in the group is received by at least one other base station in the group; and if the group includes one base station, the one base station does not receive a detection sequence sent by each neighboring station of the one base station, or a detection sequence sent by the one base station is not received by any neighboring station of the one base station; and determining a group, in the at least one group, including base stations whose quantity is greater than or equal to a preset threshold as a synchronization group, or when a quantity of base stations included in each of the at least one group is less than the threshold, determining a group, in the at least one group, including a largest quantity of base stations as the synchronization group, where a clock state of each base station in the synchronization group is a synchronization state.

Optionally, that the processing unit is configured to determine clock states of the M base stations based on the detection results of the M base stations further includes: determining, based on an out-of-synchronization condition, whether an out-of-synchronization group other than the synchronization group exists in the at least one group, where a clock state of each base station in the out-of-synchronization group is an out-of-synchronization state.

Optionally, that the processing unit is configured to determine, based on an out-of-synchronization condition, whether an out-of-synchronization group other than the synchronization group exists in the at least one group specifically includes: for any group other than the synchronization group in the at least one group, if one base station in the group meets the out-of-synchronization condition, the group is an out-of-synchronization group.

Optionally, the processing unit is further configured to:

if all base stations of a same clock source are base stations whose clock states are the out-of-synchronization state, determine that the clock source is faulty; if all base stations served by a same transmission device are base stations whose clock states are the out-of-synchronization state, determine that the transmission device is faulty; and if some base stations served by a same transmission device are all base stations whose clock states are the out-of-synchronization state, determine that the some base stations are faulty, or that ports on the transmission device that are connected to the some base stations are faulty.

In an optional design, when the apparatus is a network device, the processing unit may be, for example, a processor, and the communications unit may be, for example, a network interface. Optionally, the network device further includes a storage unit, and the storage unit may be, for example, a memory. When the network device includes the storage unit, the storage unit is configured to store a computer-executable instruction. The processing unit is connected to the storage unit. The processing unit executes the computer-executable instruction stored in the storage unit, so that the network device performs the method according to the first aspect.

In an optional design, when the apparatus is a base station, the processing unit may be, for example, a processor, and the communications unit may include, for example, an antenna, a transceiver, and a network interface. Optionally, the base station further includes a storage unit, and the storage unit may be, for example, a memory. When the base station includes the storage unit, the storage unit is configured to store a computer-executable instruction. The processing unit is connected to the storage unit. The processing unit executes the computer-executable instruction stored in the storage unit, so that the base station performs the method according to the first aspect.

In another possible design, when the apparatus is a chip in a network device or a chip in a base station, the processing unit may be, for example, a processor, and the communications unit may be, for example, an input/output interface, a pin, or a circuit. The processing unit may execute a computer-executable instruction stored in a storage unit, so that the chip performs the clock state detection method according to any one of the first aspect or the possible implementations of the first aspect. Optionally, the storage unit is a storage unit in the chip, for example, a register or a cache, or the storage unit may be a storage unit in the base station but outside the chip, for example, a read-only memory (read-only memory, ROM) or another type of static storage device capable of storing static information and instructions, or a random access memory (random access memory, RAM).

For technical effects of the apparatus provided in this application, refer to technical effects of the first aspect or the implementations of the first aspect. Details are not described herein again.

According to a fourth aspect, an embodiment of this application provides an apparatus. The apparatus may be a base station, or the apparatus may be a chip in a base station. The apparatus has a function of implementing the method according to the second aspect. The function may be implemented by hardware, or may be implemented by hardware executing corresponding software. The hardware or the software includes one or more modules corresponding to the foregoing function. The apparatus includes a processing unit and a communications unit. Optionally, the apparatus may further include a storage unit. The processing unit may receive or send information by using the communications unit, and the processing unit may process the information, so that the apparatus implements the method according to the second aspect.

The processing unit is configured to receive indication information by using the communications unit. The indication information is used to indicate N first time points at which N neighboring stations of the base station sequentially send detection sequences. N is an integer greater than or equal to 1.

The processing unit is further configured to detect the detection sequences at the N first time points. For each of the N neighboring stations, when the base station detects the detection sequence at the first time point at which the neighboring station sends the detection sequence, the base station determines that the detection sequence from the neighboring station is received.

The processing unit is further configured to send a detection result by using the communications unit, where the detection result is used to indicate whether the base station receives the detection sequence sent by each of the N neighboring stations, to determine a clock state of the base station.

Optionally, the first indication information is further used to indicate a second time point at which the base station sends a detection sequence. The processing unit is further configured to send the detection sequence at the second time point by using the communications unit.

In an optional design, when the apparatus is a base station, the processing unit may be, for example, a processor, and the communications unit may include, for example, an antenna, a transceiver, and a network interface. Optionally, the base station further includes a storage unit, and the storage unit may be, for example, a memory. When the base station includes the storage unit, the storage unit is configured to store a computer-executable instruction. The processing unit is connected to the storage unit. The processing unit executes the computer-executable instruction stored in the storage unit, so that the base station performs the method according to the first aspect.

In another possible design, when the apparatus is a chip in a base station, the processing unit may be, for example, a processor, and the communications unit may be, for example, an input/output interface, a pin, or a circuit. The processing unit can execute a computer-executable instruction stored in a storage unit, so that the chip in the base station performs the method according to the second aspect. Optionally, the storage unit is a storage unit in the chip, for example, a register or a cache, or the storage unit may be a storage unit in the base station but outside the chip, for example, a read-only memory (read-only memory, ROM) or another type of static storage device capable of storing static information and instructions, or a random access memory (random access memory, RAM).

For technical effects of the apparatus provided in this application, refer to technical effects of the second aspect or the implementations of the second aspect. Details are not described herein again.

The processor mentioned above may be a general-purpose central processing unit (CPU), a microprocessor, an application-specific integrated circuit (application-specific integrated circuit, ASIC), or one or more integrated circuits configured to control program execution of the method according to the second aspect.

Based on any one of the first aspect to the fourth aspect, optionally, the first time point is a first special subframe.

Optionally, the indication information is further used to indicate the second time point at which the base station sends the detection sequence.

Optionally, the second time point is a second special subframe.

In this example, a neighboring station of the base station sends a detection sequence in a special subframe, and the base station detects the detection sequence in the special subframe, so that air interface detection can be completed to analyze the clock states of the M base stations, without affecting uplink and downlink services of the base station.

Based on either of the first aspect and the third aspect, optionally, second time points of at least two base stations that have no same neighboring station in the M base stations are the same.

The second time points of the at least two base stations that have no same neighboring station are made to be the same, thereby reducing a time for sending the detection sequences by the M base stations, and improving the detection efficiency.

Optionally, time division duplex TDD configurations of the M base stations are the same.

The TDD configurations of the M base stations are set to be the same. Therefore, for one subframe, uplink-downlink configurations of the M base stations are the same, and the M base stations may receive and send detection sequences in a guard period (guard interval, GP) in a unified manner, thereby avoiding impact on uplink and downlink data transmission of the M base stations.

Optionally, the detection result of each of the M base stations is further used to indicate a delay in receiving, by the base station, the detection sequence sent by each of the N neighboring stations of the base station.

Based on the delay indicated in the detection result, whether an interstation deviation exists between the base stations that are in non-out-of-synchronization state and a deviation level may be analyzed.

Optionally, the uplink of each of the M base stations is not interfered with by the downlinks of the N neighboring stations of the base station.

Optionally, the out-of-synchronization condition includes one or more of the following conditions:

1) a clock system adjustment value of the one base station is greater than a preset adjustment threshold;

2) the one base station launches a clock alarm; or 3) out-of-synchronization interference to a neighboring station of the one base station is greater than a preset interference threshold, and after the one base station is silent, the out-of-synchronization interference to the neighboring station of the one base station disappears; or out-of-synchronization interference to the one base station is greater than a preset interference threshold, and after a neighboring station of the one base station is silent, the out-of-synchronization interference to the one base station disappears.

Optionally, if the group includes at least two base stations, the out-of-synchronization condition further includes:

4) the plurality of base stations obtain clock signals from a same clock device.

Optionally, M is greater than 100.

When a value of M is relatively large, for example, M is greater than 100, big data analysis may be performed based on the M detection results, to accurately determine the clock states of the M base stations.

Based on either of the second aspect and the fourth aspect, optionally, before the indication information is received, an uplink of the base station is not interfered with by downlinks of the N neighboring stations of the base station.

Optionally, time division duplex TDD configurations of the base station and the N neighboring stations are the same.

According to a fifth aspect, an embodiment of this application provides a computer storage medium. The computer storage medium stores a program configured to implement the method according to the first aspect. When the program is run in the apparatus, the apparatus performs the method according to the first aspect.

According to a sixth aspect, an embodiment of this application provides a computer storage medium. The computer storage medium stores a program configured to implement the method according to the second aspect. When the program is run in the apparatus, the apparatus performs the method according to the second aspect.

According to a seventh aspect, an embodiment of this application provides a computer program product. The program product includes a program, and when the program is run, the method according to the first aspect is performed.

According to an eighth aspect, an embodiment of this application provides a computer program product. The program product includes a program, and when the program is run, the method according to the second aspect is performed.

According to a ninth aspect, this application provides a communications system, including the apparatus according to the third aspect and the apparatus according to the fourth aspect.

Optionally, the communications system includes M apparatuses according to the fourth aspect.

DESCRIPTION OF EMBODIMENTS

First, when an ordinal number such as "first", "second", or "third" is mentioned in this application, it should be understood that the ordinal number is merely used for distinguishing unless the ordinal number definitely represents a sequence based on a context.

Figure 1:
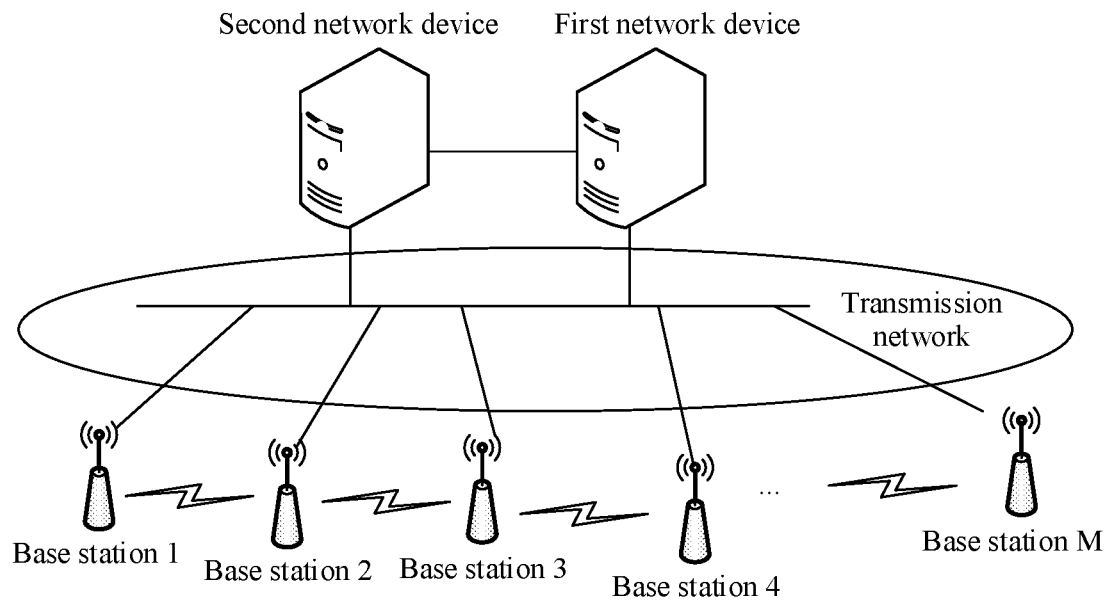
FIG. 1 is a schematic diagram of a communications system according to this application.

Second, the technical solutions provided in this application are used in a communications system shown in FIG. 1. The communications system includes M base stations. Data may be transmitted between the M base stations through an air interface. M is greater than 1. Each of the M base stations has at least one neighboring station in the M base stations. For example, as shown in FIG. 1, the M base stations include a base station 1, a base station 2, a base station 3, a base station 4, . . . , and a base station M. For example, the base station 2 has two neighboring stations: the base station 1 and the base station 3. The base station 1 has one neighboring station: the base station 2. The base station 3 has two neighboring stations: the base station 2 and the base station 4. The base station 4 has one neighboring station: the base station 3.

Optionally, the communications system may further include a first network device and a second network device. Optionally, the first network device is separately connected to K base stations. Optionally, the second network device is separately connected to the K base stations. Optionally, the first network device is connected to the second network device. A terminal may communicate with one or more of the K base stations in FIG. 1 through an air interface.

The communications system shown in FIG. 1 may be a communications system that supports a fourth generation (fourth generation, 4G) access technology, for example, a long term evolution (long term evolution, LTE) access technology. Alternatively, the communications system may be a communications system that supports a fifth generation (fifth generation, 5G) access technology, for example, a new radio (new radio, NR) access technology. Alternatively, the communications system may be a communications system that supports a plurality of wireless technologies, for example, a communications system that supports the LTE technology and the NR technology. In addition, the communications system is also applicable to a future-oriented communications technology.

In the communications system shown in FIG. 1, the base station may be an evolved NodeB (evolved NodeB, eNB) in the communications system that supports the 4G access technology, a next generation NodeB (next generation NodeB, gNB) in the communications system that supports the 5G access technology, or a transmission reception point (transmission reception point, TRP), a relay node (relay node), an access point (access point, AP), or the like.

In the communications system shown in FIG. 1, the first network device (or the second network device) may be a transmission device in a transmission network, for example, a router or a switch. Alternatively, the first network device (or the second network device) may be another server capable of maintaining a plurality of base stations in the system, for example, may be a mobile management entity (mobile management entity, MME) or a serving gateway (serving gateway, SGW) in the communications system that supports the 4G access technology, an access and mobility management function (access and mobility management function, AMF) network element or a user plane function (User Plane Function, UPF) network element in the communications system that supports the 5G access technology, or a network management server.

Figure 2:
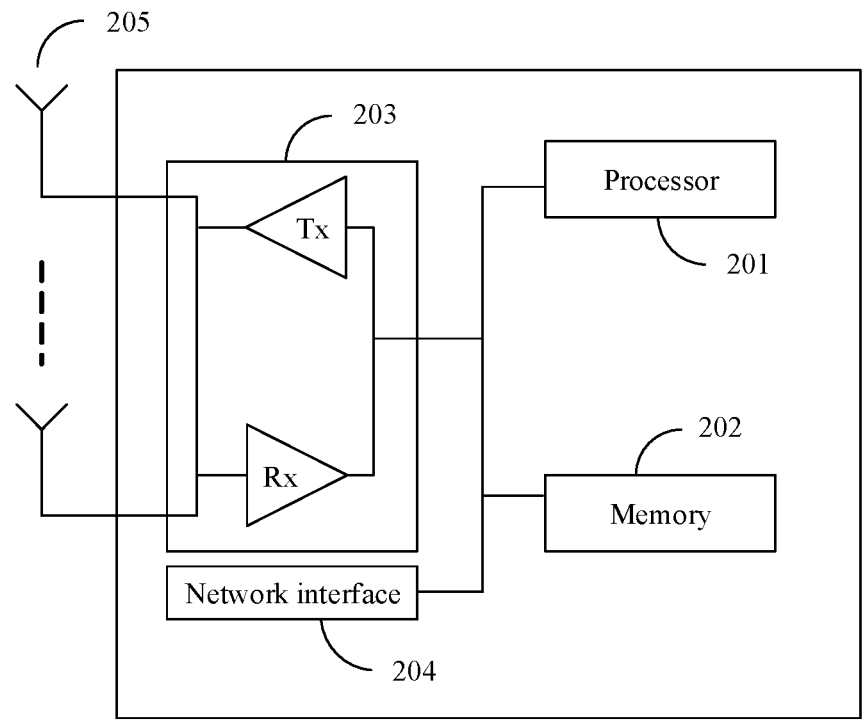
FIG. 2 is a schematic structural diagram of a base station according to this application.

FIG. 2 is a schematic structural diagram of a base station. The base station may be the base station 1, the base station 2, the base station 3, the base station 4, . . . , or the base station M in the embodiments of this application.

The base station includes at least one processor 201, at least one memory 202, at least one transceiver 203, at least one network interface 204, and one or more antennas 205. The processor 201, the memory 202, the transceiver 203, and the network interface 204 are connected, for example, by using a bus. The antenna 205 is connected to the transceiver 203. The network interface 204 is configured to enable the base station to connect to another communications device by using a communications link. For example, through an S1 interface, the base station is connected to a network device, for example, may be connected to a first network device or a second network device. In this embodiment of this application, the connection may include various types of interfaces, transmission lines, buses, or the like. This is not limited in this embodiment.

The processor 201 in this embodiment of this application may include at least one of the following types: a general-purpose central processing unit (central processing unit, CPU), a digital signal processor (digital signal processor, DSP), a microprocessor, an application-specific integrated circuit (application-specific integrated circuit, ASIC), a micro controller unit (micro controller unit, MCU), a field programmable gate array (field programmable gate array, FPGA), or an integrated circuit configured to implement a logical operation. For example, the processor 201 may be a single-core (single-CPU) processor or a multi-core (multi-CPU) processor. The at least one processor 201 may be integrated into one chip or located on a plurality of different chips.

The memory 202 in this embodiment of this application may include at least one of the following types: a read-only memory (read-only memory, ROM), or another type of static storage device capable of storing static information and instructions, or a random access memory (random access memory, RAM), or another type of dynamic storage device capable of storing information and instructions, or an electrically erasable programmable read-only memory (electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited herein.

The memory 202 may exist independently, or may be connected to the processor 201. Optionally, the memory 202 may alternatively be integrated with the processor 201, for example, integrated into a chip. The memory 202 can store a program for executing the technical solutions in the embodiments of this application, and the processor 201 controls execution of the program. Various types of computer program code that is executed may also be considered as a driver of the processor 201. For example, the processor 201 is configured to execute the computer program code stored in the memory 202, to implement the technical solutions in the embodiments of this application.

The transceiver 203 may be configured to support receiving or sending of an air interface signal between base stations, and the transceiver 203 may be connected to the antenna 205. The transceiver 203 includes a transmitter Tx and a receiver Rx. Specifically, the one or more antennas 205 may receive an air interface signal. The receiver Rx of the transceiver 203 is configured to: receive the air interface signal from the antenna, convert the air interface signal into a digital baseband signal or a digital intermediate frequency signal, and provide the digital baseband signal or the digital intermediate frequency signal to the processor 201, so that the processor 201 performs further processing, for example, demodulation processing and decoding processing, on the digital baseband signal or the digital intermediate frequency signal. In addition, the transmitter Tx of the transceiver 203 is further configured to: receive a modulated digital baseband signal or digital intermediate frequency signal from the processor 201, convert the modulated digital baseband signal or digital intermediate frequency signal into an air interface signal, and send the air interface signal by using the one or more antennas 205. Specifically, the receiver Rx may selectively perform one or more levels of frequency down-mixing processing and analog-to-digital conversion processing on the air interface signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal, to obtain the air interface signal. A sequence of the frequency up-mixing processing and the digital-to-analog conversion processing may be adjustable. The digital baseband signal and the digital intermediate frequency signal may be collectively referred to as a digital signal.

Figure 3:
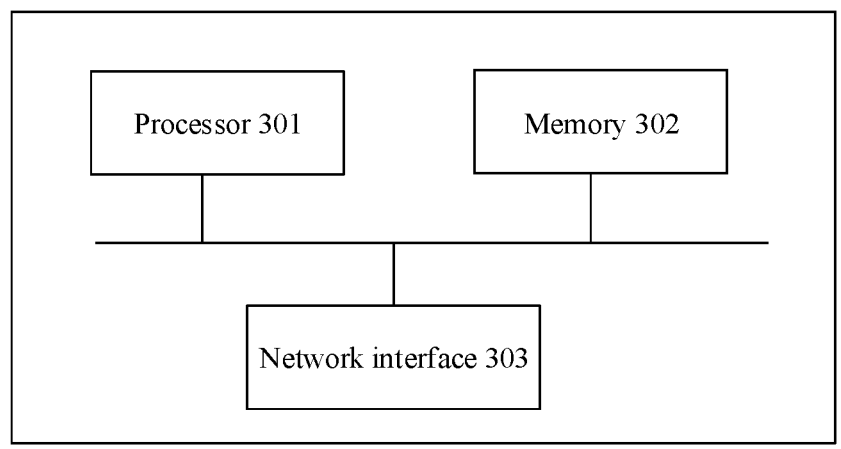
FIG. 3 is a schematic structural diagram of a network device according to this application.

FIG. 3 is a schematic structural diagram of a network device. The network device may be the first network device or the second network device in the embodiments of this application. The network device may include at least one processor 301, at least one memory 302, and at least one network interface 303. The processor 301 and the memory 302 are connected to the network interface 303.

The processor 301 may be configured to implement various functions for the network device, for example, a function of controlling a plurality of base stations to perform air interface detection, or a function of analyzing a clock state based on a result of air interface detection performed by each of a plurality of base stations.

The memory 302 may be configured to store program code for executing the technical solutions in the embodiments of this application, and the program code is executed by the processor 301, to implement the functions of the network device in the embodiments of this application.

The network device may communicate with a base station through the network interface 303. The network interface 303 may be used to send data to the base station by using a transmission network, and/or receive data from the base station by using a transmission network. For example, the network device may communicate with the base station 1, the base station 2, the base station 3, the base station 4, . . . , or the base station M through the network interface 303.

In this application, the first network device may have both a centralized control function and a clock state analysis function, to implement a clock state detection manner provided in this application. Alternatively, the first network device has a clock state analysis function, the second network device has a centralized control function, and the first network device and the second network device cooperate to implement a clock state detection manner provided in this application.

In the communications system shown in FIG. 1, a time division duplex (time division duplex, TDD) technology may be used for communication between the M base stations and the terminal. The M base stations need to strictly keep clock synchronization. If clocks of two base stations are not synchronized, a downlink of one base station may interfere with an uplink of the other base station.

Figure 4:
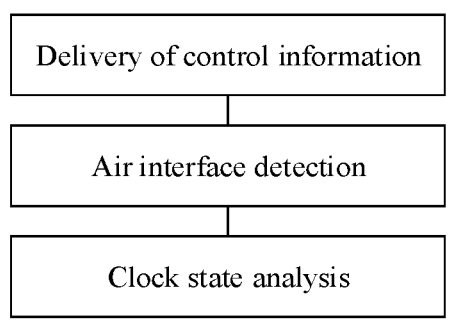
FIG. 4 is a schematic flowchart of a clock state detection method according to this application.

This application provides a clock state detection solution, to detect clock states of M base stations, so as to perform troubleshooting, warning, and rectification in advance, thereby ensuring clock synchronization of the base stations, normal running of services of the base stations, and user experience of UE. In this solution, the M base stations each may send and receive a detection sequence over an air interface. The clock states of the M base stations may be detected by analyzing results of the detection sequences received by the M base stations. As shown in FIG. 4, this solution may specifically include the following three parts:

First part: Delivery of control information. Time points at which M base stations send detection sequences and time points at which the M base stations receive detection sequences are uniformly configured to form M pieces of indication information. Each piece of indication information may indicate a time point at which one base station sends a detection sequence and a time point at which each of N neighboring stations of the base station sends a detection sequence. Then the M pieces of indication information are delivered to the M base stations.

Second part: Air interface detection. Each of the M base stations may learn of, based on the received indication information, the time point at which each of the N neighboring stations of the base station sends the detection sequence. Then the base station detects the detection sequence at the time point at which each of the N neighboring stations of the base station sends the detection sequences, to form a detection result. The detection result may indicate whether the base station receives the detection sequence from each of the N neighboring stations of the base station.

Third part: Clock state analysis. Clock states of the M base stations may be determined based on the detection results of the M base stations, and some conditions may be configured. The condition may be a synchronization condition, an out-of-synchronization condition, or a deviation condition. Then, it is determined, based on the detection results of the M base stations, whether the M base stations meet the synchronization condition, the out-of-synchronization condition, or the deviation condition, to learn of whether a clock state of the base station is a synchronization state, an out-of-synchronization state, or a deviation state. For example, if a base station can receive a detection sequence at a time point at which a neighboring station of the base station sends the detection sequence, or a neighboring station of a base station can receive a detection sequence at a time point at which the base station sends the detection sequence, the base station is relatively synchronized with the neighboring station of the base station. A quantity of base stations that are relatively synchronized with any other base station in the M base stations is analyzed, and when the quantity reaches a number, it may be considered that these base stations are synchronized, that is, clock states of all of these base stations are synchronized. When the quantity does not reach the number, these base stations may be out of synchronization or have a deviation, and whether these base stations are in the out-of-synchronization state or the deviation state is separately determined in this case.

The first part of the foregoing three parts may be performed by different devices. For example, the first part may be performed by one of the M base stations, or the first part may be performed by a network device, for example, performed by a first network device or a second network device. The second part is performed by the M base stations. The third part may be performed by one of the M base stations, or the third part may be performed by the network device, for example, performed by the first network device or the second network device. The following describes this solution by using an example in which the first part is performed by the first network device, the second part is performed by the M base stations, and the third part is performed by the first network device. A person skilled in the art may learn that content in the embodiments of this application is also applicable to a case in which the foregoing three parts are performed by another device. This is not limited in the embodiments of this application.

Figure 5:
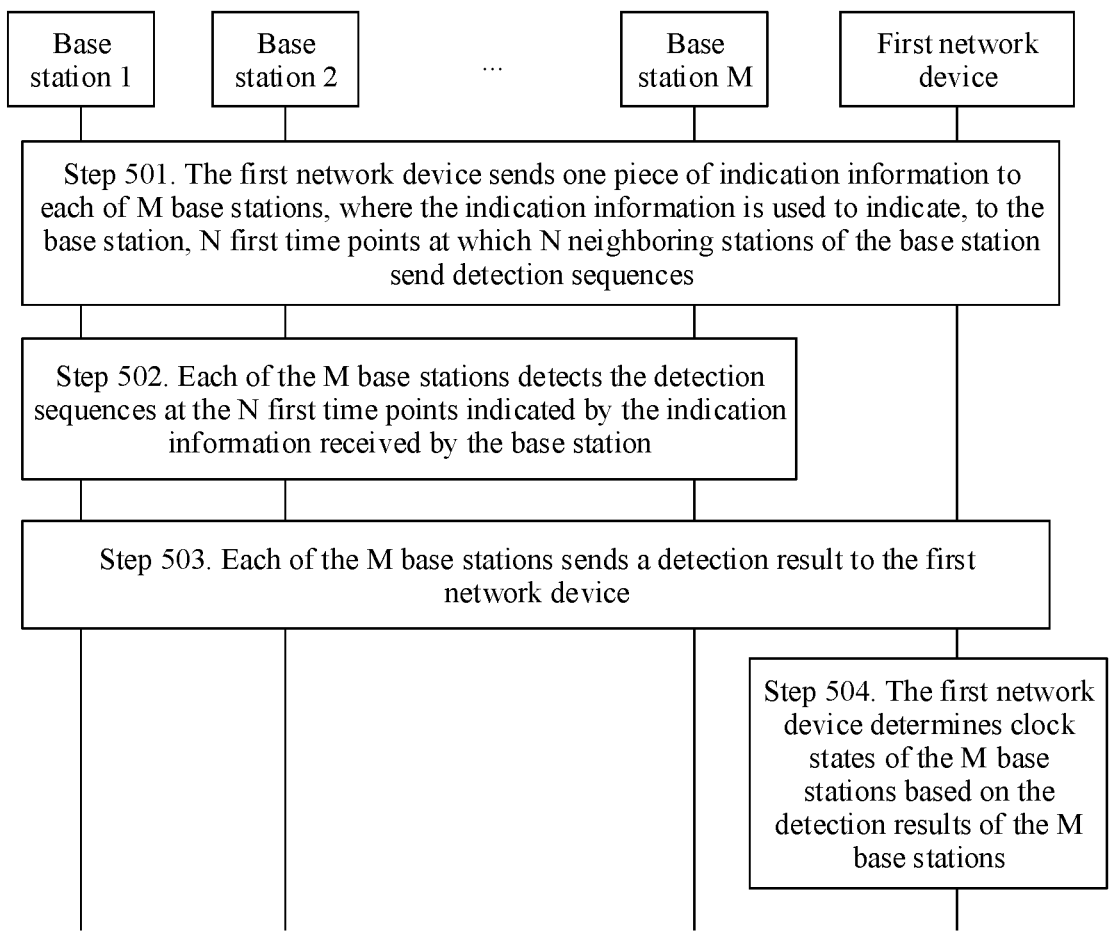
FIG. 5 is a schematic flowchart of an embodiment of a clock state detection method according to this application.

FIG. 5 is a schematic flowchart of an embodiment of a clock state detection method according to this application. For example, the method is used in the communications system shown in FIG. 1. The M base stations are the base station 1, the base station 2, the base station 3, the base station 4, . . . , and the base station M. The base station 1 and the base station 2 are neighboring stations of each other, the base station 1 and the base station 3 are neighboring stations of each other, and the base station 3 and the base station 4 are neighboring stations of each other. The method includes the following steps.

Step 501. A first network device sends one piece of indication information to each of the M base stations, where the indication information is used to indicate, to the base station, N first time points at which N neighboring stations of the base station send detection sequences.

For example, the first network device sends indication information 1 to the base station 1, sends indication information 2 to the base station 2, . . . , and sends indication information M to the base station M.

The indication information 1 may be used to indicate $N_1$ ($N_1 \geq 1$) first time points at which $N_1$ neighboring stations of the base station 1 send detection sequences. The indication information 2 may be used to indicate $N_2$ ($N_2 \geq 1$) first time points at which $N_2$ neighboring stations of the base station 2 send detection sequences. By analogy, the indication information M may be used to indicate $N_M$ ($N_M \geq 1$) first time points at which $N_M$ neighboring stations of the base station M send detection sequences.

For example, the base station 1 has two neighboring stations: the base station 2 and the base station 3. The base station 2 has only one neighboring station: the base station 1. For example, if a time point at which the base station 1 sends the detection sequence is T1, a time point at which the base station 2 sends the detection sequence is T2, and a time point at which the base station 3 sends the detection sequence is T3, $N_1=2$, and the $N_1$ first time points indicated by the indication information 1 are T2 and T3; and $N_2=2$, and the $N_2$ first time points indicated by the indication information 2 are T1.

Optionally, the N first time points at which the N neighboring stations of the base station send the detection sequences are different, to avoid mutual interference between the detection sequences sent by the N neighboring stations of the base station. For example, in the foregoing example, the two first time points T2 and T3 indicated by the indication information 1 are different. The base station 2 and the base station 3 send the detection sequences at different time points, so that interference between the detection sequence of the base station 2 and the detection sequence of the base station 3 can be avoided. Therefore, it can be ensured that when detecting a detection sequence, the base station 1 determines, based on the time point, whether the detection sequence is sent by the base station 2 or sent by the base station 3. For example, if the base station 1 detects the detection sequence at T2, it may be determined that the detection sequence is sent by the base station 2. If the base station 2 detects the detection sequence at T3, it may be determined that the detection sequence is sent by the base station 3.

Optionally, each of the N first time points may include a plurality of sending time points. For example, the first time point T2 at which the base station 2 sends the detection sequence includes a plurality of sending time points. The base station 2 may continuously send the detection sequence for a plurality of times at the plurality of sending time points of T2. If the base station 1 detects the detection sequence at one or more sending time points on a plurality of radio frames, the base station 1 may determine that the detection sequence sent by the base station 2 is received. An indication of the plurality of sending time points enables the base station to detect a sequence for a plurality of times. In this way, a case in which the base station does not detect the detection sequence at a first time point because quality of a channel between the base station and a neighboring station of the base station is relatively poor is excluded. Therefore, detection precision is improved.

Optionally, all the M base stations may use TDD, and TDD configurations of the M base stations may be the same. Therefore, for one subframe, uplink-downlink configurations of the M base stations are the same, and the M base stations may receive and send the detection sequences in a guard interval (guard interval, GP) in a unified manner, thereby avoiding impact on uplink and downlink data transmission of the M base stations.

Optionally, the first time point may include at least one first special subframe. For example, the first time points indicated by the indication information 1 are T2 and T3. T2 includes at least one first special subframe, and T3 includes at least one first special subframe. The at least one first special subframe included in T2 may be different from the at least one first special subframe included in T3. The neighboring stations of the base station send the detection sequences in a special subframe, and the base station detects the detection sequence in the special subframe, so that air interface detection can be completed without affecting uplink and downlink services of the base station, to analyze clock states of the M base stations.

Optionally, the indication information may further indicate a second time point at which the base station sends a detection sequence. For example, the indication information 1 is further used to indicate a second time point at which the base station 1 sends a detection sequence. The indication information 2 is further used to indicate a second time point at which the base station 2 sends a detection sequence. By analogy, the indication information M is further used to indicate a second time point at which the base station M sends a detection sequence.

For example, if the time point at which the base station 1 sends the detection sequence is T1, and the time point at which the base station 2 sends the detection sequence is T2, the indication information 1 may further indicate the time point T1 at which the base station 1 sends the detection sequence, and the indication information 2 may further indicate the time point T2 at which the base station 2 sends the detection sequence.

Optionally, the second time point may include at least one second special subframe. For example, the second time point T1 indicated by the indication information 1 includes at least one second special subframe.

Step 502. Each of the M base stations detects the detection sequences at the N first time points indicated by the indication information received by the base station.

For example, the base station 1 may detect, at the $N_1$ ($N_1 \geq 1$) first time points, the detection sequences sent by the $N_1$ neighboring stations of the base station 1. The base station 2 may detect, at the $N_2$ ($N_2 \geq 1$) first time points, the detection sequences sent by the $N_2$ neighboring stations of the base station 2. By analogy, the base station M may detect, at the $N_M$ ($N_M \geq 1$) first time points, the detection sequences sent by the $N_M$ neighboring stations of the base station M.

Each of the M base stations detects the detection sequences at the N first time points indicated by the received indication information. When the base station detects a detection sequence at a first time point at which a neighboring station sends the detection sequence, the base station determines that the detection sequence from the neighboring station is received.

For example, the base station 1 separately detects the detection sequences at T2 and T3 that are indicated by the indication information 1. If the base station 1 detects the detection sequence at T2, the base station 1 determines that the detection sequence sent by the base station 2 is received. If the base station 1 detects the detection sequence at T3, the base station 1 determines that the detection sequence sent by the base station 3 is received. The base station 2 detects the detection sequence at T1 indicated by the indication information 2. If the base station 2 detects the detection sequence at T1, the base station 2 determines that the detection sequence sent by the base station 1 is received. The base station 3 separately detects the detection sequences at T1 and T4 that are indicated by indication information 3. If the base station 3 detects the detection sequence at T1, the base station 3 determines that the detection sequence sent by the base station 1 is received. If the base station 3 detects the detection sequence at T4, the base station 3 determines that the detection sequence sent by the base station 4 is received. The base station 4 detects the detection sequence at T3 indicated by the indication information 4. If the base station 4 detects the detection sequence at T3, the base station 4 determines that the detection sequence sent by the base station 3 is received.

Each base station obtains a detection result after completing detection of the detection sequences at the N first time points indicated by the indication information received by the base station. The detection result of each base station is used to indicate whether the base station receives the detection sequence sent by each of the N neighboring stations of the base station.

For example, the base station 1 does not detect the detection sequence at T2, but detects the detection sequence at T3. Therefore, a detection result obtained by the base station 1 is that the base station 1 receives the detection sequence sent by the base station 3, but does not receive the detection sequence sent by the base station 2. The base station 2 does not detect the detection sequence at T1. Therefore, a detection result obtained by the base station 2 is that the base station 2 does not receive the detection sequence sent by the base station 1. The base station 3 detects the detection sequence at both T1 and T4. Therefore, a detection result obtained by the base station 3 is that the base station 3 receives the detection sequences sent by the base station 1 and the base station 4. The base station 4 detects the detection sequence at T3. Therefore, a detection result obtained by the base station 4 is that the base station 4 receives the detection sequence sent by the base station 3.

In this application, the base station may implement the air interface detection by using a transceiver and an antenna to receive and send a detection sequence.

Step 503. Each of the M base stations sends the detection result to the first network device.

In this application, each of the M base stations may send the detection result after completing the detection on the N neighboring stations. For example, after completing detection of the detection sequences at T2 and T3, the base station 1 may send the detection result to the first network device. Alternatively, each base station may send the detection result of the base station after each of the M base stations completes the detection on the N neighboring stations of the base station. For example, the indication information carries a periodicity Tin which the base station 1, the base station 2, the base station 3, and the base station 4 complete one time of air interface detection. The base station 1, the base station 2, the base station 3, and the base station 4 may send the detection results thereof to the first network device by the end of the periodicity T.

Step 504. The first network device determines the clock states of the M base stations based on the detection results of the M base stations.

There are one or more of the following cases for determining the clock states of the M base stations:

(1) Base stations whose clock states are a synchronization state in the M base stations are determined.

(2) Base stations whose clock states are an out-of-synchronization state in the M base stations are determined.

(3) Whether an interstation deviation exists between base stations whose clock states are a non-out-of-synchronization state in the M base stations is determined.

The "non-out-of-synchronization" in the foregoing condition (3) may be understood as one or both of the following cases:

(a) The clock state is the synchronization state.

(b) The clock state is neither the synchronization state nor an out-of-synchronization state.

Optionally, the first network device may first group the M base stations into at least one group based on the detection results of the M base stations.

The following describes how to determine the base stations whose clock states are the synchronization state in the M base stations. It can be determined, through grouping, whether a group is a synchronization group. When the group is a synchronization group, clock states of all base stations in the group are the synchronization state.

In this embodiment of this application, two neighboring base stations are relatively synchronized with each other, if one base station can receive a detection sequence from the other base station, and/or the other base station can receive a detection sequence from the base station.

The first network device groups the M base stations into the at least one group based on the detection results of the M base stations. For each of the at least one group, if the group includes at least two base stations, each base station in the group receives a detection sequence sent by at least one other base station in the group, or a detection sequence sent by each base station in the group is received by at least one other base station in the group, that is, each base station in the group is relatively synchronized with the at least one other base station in the group. If the group includes at least one base station, the one base station does not receive a detection sequence sent by each neighboring station of the one base station, or a detection sequence sent by the one base station is not received by any neighboring station of the one base station, that is, if one of the M base stations does not have a neighboring station that is relatively synchronized with the base station, the base station can form a group independently.

For each of the at least one group, there is no base station outside the group that is relatively synchronized with a base station in the group.

For example, an example in which the base station 1, the base station 2, the base station 3, and the base station 4 are grouped is used for description herein. It should be noted that the M base stations may be two, three, five, more than five, or even hundreds or thousands of base stations. The first network device groups the four base stations into at least one group, for example, a group 1 and a group 2. The group 1 includes at least the base station 1, the base station 3, and the base station 4. The base station 1 can receive the detection sequence from the base station 3, and the base station 3 can receive the detection sequence from the base station 1. The base station 3 can receive the detection sequence from the base station 4, and the base station 4 can receive the detection sequence from the base station 3. The group 2 includes the base station 2. The base station 2 cannot receive the detection sequence from the base station 1, and the detection sequence sent by the base station 2 cannot be received by the base station 1.

After obtaining the at least one group, the first network device may determine, according to a majority vote rule, a group, in the at least one group, including base stations whose quantity is greater than or equal to a preset threshold as a synchronization group, or when a quantity of base stations included in each of the at least one group is less than the threshold, determine a group, in the at least one group, including a largest quantity of base stations as the synchronization group, where a clock state of each base station in the synchronization group is the synchronization state.

For example, if the threshold is 100, a quantity of base stations in the group 1 and a quantity of base stations in the group 2 are both less than 100, and the quantity of base stations in the group 1 is greater than the quantity of base stations in the group 2, it may be determined that the group 1 is a synchronization group, and the clock states of the base station 1, the base station 2, and the base station 3 are the synchronization state.

The following describes how to determine, by the first network device after determining the base stations whose clock states are the synchronization state in the M base stations, the base stations whose clock states are the out-of-synchronization state. The first network device may determine, based on an out-of-synchronization condition, whether an out-of-synchronization group other than the synchronization group exists in the at least one group, where a clock state of each base station in the out-of-synchronization group is the out-of-synchronization state.

For example, for a group (the group may include one base station, or the group may include more than two base stations) other than the synchronization group in the at least one group, it may be determined whether one base station in the group meets the out-of-synchronization condition. If the base station meets the out-of-synchronization condition, a clock state of the base station is the out-of-synchronization state, and the group is an out-of-synchronization group. The out-of-synchronization condition includes but is not limited to one or more of the following conditions:

1) A clock system adjustment value of the one base station is greater than a preset adjustment threshold.

The base station may include an internal clock system and an external clock source of the base station. The base station may receive a time of the external clock source to adjust a time of the internal clock system. The clock system adjustment value of the base station may be a difference between the time of the internal clock system of the base station and the time of the clock source of the base station at a time point, or an accumulated difference between the time of the clock system of the base station and the time of the clock source of the base station in a time period.

2) The one base station launches a clock alarm.

When the clock system of the base station is faulty, the base station launches the clock alarm. If the one base station launches a clock alarm, it indicates that the clock system of the base station is faulty, and the clock state of the base station may be the out-of-synchronization state.

3) Out-of-synchronization interference to a neighboring station of the one base station is greater than a preset interference threshold, and after the one base station is silent, the out-of-synchronization interference to the neighboring station of the one base station disappears; or out-of-synchronization interference to the one base station is greater than a preset interference threshold, and after a neighboring station of the one base station is silent, the out-of-synchronization interference to the one base station disappears.

For example, the base station 2 is used as an example. The neighboring station of the base station 2 is the base station 1. If out-of-synchronization interference exists in the base station 1 (that is, an uplink of the base station 1 is interfered with by a downlink of a base station), and the out-of-synchronization interference is greater than the preset interference threshold, it indicates that the base station 1 is relatively out of synchronization with the neighboring station of the base station 1. After the base station 2 is made to be silent, the interference to the base station 1 disappears, which indicates that the base station 2 is a base station that causes interference to the base station 1. A possible cause is that the clock state of the base station 2 is the out-of-synchronization state.

Correspondingly, if an out-of-synchronization interference exists in the base station 2 (that is, an uplink of the base station 2 is interfered with by a downlink of a base station), and the out-of-synchronization interference is greater than the preset interference threshold, it indicates that the base station 2 is relatively out of synchronization with the neighboring station of the base station 2. After the base station 1 is made to be silent, the interference to the base station 2 disappears, which indicates that the base station 2 is a base station that causes interference to the base station 1. A possible cause is also that the clock state of the base station 2 is the out-of-synchronization state.

4) A clock state of the one base station in a previous periodicity is the synchronization state, the base station is relatively synchronized with at least two neighboring stations, and clock states of the at least two neighboring stations in the previous periodicity and a current periodicity are both the synchronization state.

When the M base stations and the first network device periodically perform the foregoing steps 502 to 504, if a base station is relatively synchronized with a neighboring station (a clock state of the neighboring station is the synchronization state) in a previous periodicity, a clock state of the base station is determined as the synchronization state. However, in a current periodicity, if the clock state is determined to be not the synchronization state, a possible cause is clock out-of-synchronization of the base station, or is that the base station and the neighboring station cannot receive a detection sequence from each other due to relatively poor channel quality. If a base station is relatively synchronized with at least two neighboring stations (clock states of the at least two neighboring stations are the synchronization state) in a previous periodicity, a clock state of the base station is determined as the synchronization state. However, in a current periodicity, if the clock state is determined to be not the synchronization state, a highly possible cause is clock out-of-synchronization of the base station.

It may be understood that, because base stations in a same group are all relatively synchronized, when a clock state of a base station is the out-of-synchronization state, clock states of base stations that are relatively synchronized with the base station are all the out-of-synchronization state. Therefore, for any group other than the synchronization group in the at least one group, if a clock state of any base station in the group is determined as the out-of-synchronization state based on the foregoing out-of-synchronization condition, clock states of all base stations in the group are all the out-of-synchronization state.

Optionally, if the group includes at least two base stations, in addition to the foregoing conditions 1), 2), 3), and 4), the out-of-synchronization condition may further include the following conditions:

5) The at least two base stations obtain clock signals from a same clock device.

The clock device may be a clock source or a transmission device, and the transmission device is a device for transmitting a clock signal between the two base stations and the clock source. If clock states of the at least two base stations are both non-synchronization, and the at least two base stations further obtain the clock signals from the same clock device, it indicates that the clock device may be faulty, which may cause the out-of-synchronization state of the at least two base stations.

6) Clock states of at least two base stations in the group in a previous periodicity are the synchronization state.

When the M base stations and the first network device periodically perform the foregoing steps 502 to 504, if a clock state of a base station in a previous periodicity is determined as the synchronization state, the clock state of the base station in a current periodicity may be determined as the out-of-synchronization state. It may be understood that, if a clock state of a base station in a group changes from the synchronization state to the out-of-synchronization state, a possible cause is that the base station is out of synchronization, or is that the base station and a neighboring station whose clock state is the synchronization state cannot receive a detection sequence from each other due to relatively poor channel quality. Therefore, if the clock state of the base station in the group changes from the synchronization state to the out-of-synchronization state, it does not indicate that the base station is out of synchronization, and it cannot indicate that all base stations in the group that are relatively synchronized with the base station are all out of synchronization. However, if clock states of at least two base stations in the group change from the synchronization state to the out-of-synchronization state, it indicates that there is a relatively high probability that the clock states of the at least two base stations change to the out-of-synchronization state.

According to the clock state detection method provided in this application, one or more base stations whose clock states are the out-of-synchronization state can be detected, to locate a faulty base station and a faulty clock source, and perform maintenance in a timely manner, thereby ensuring normal running of a service of the base station, and ensuring user experience of UE.

The following describes how to determine, by the first network device after determining the base stations whose clock states are the synchronization state and the base stations whose clock states are the out-of-synchronization state in the M base stations, whether the interstation deviation exists between the base stations that are not in the non-out-of-synchronization state.

For example, the first network device may calculate, based on a detection result reported by a base station that is in the non-out-of-synchronization state, an interstation deviation between two neighboring base stations that receive a detection sequence sent by each other and that are in the non-out-of-synchronization state.

Optionally, if the base station can receive the detection sequence sent by the neighboring station of the base station, the base station may measure a corresponding receive delay, and the detection result of the base station may include the receive delay for receiving the detection sequence by the base station. Further, the first network device may calculate, based on the receive delay, the interstation deviation between the two neighboring base stations that receive the detection sequence sent by each other and that are in the non-out-of-synchronization state.

Figure 6:
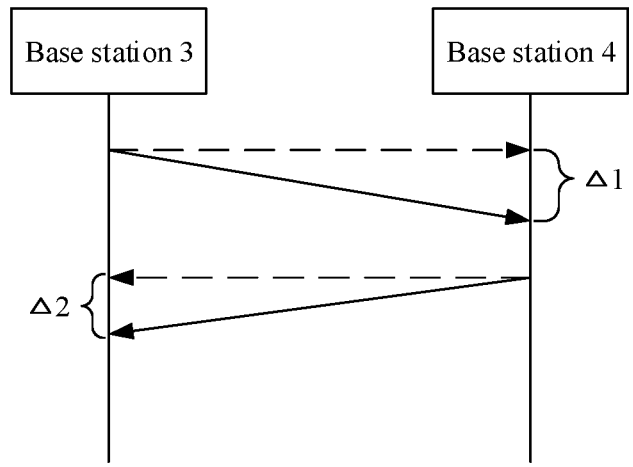
FIG. 6 is a schematic diagram of receive delay detection according to this application.

For example, as shown in FIG. 6, the base station 4 and the base station 3 can receive a detection sequence from each other. $\Delta 1$ represents a receive delay for receiving the detection sequence by the base station 4 from the base station 3, and $\Delta 2$ represents a receive delay for receiving the detection sequence by the base station 3 from the base station 4.

Optionally, the detection result of the base station 3 may include $\Delta 2$ and $\Delta 3$ (it is assumed that $\Delta 3$ represents a receive delay for receiving the detection sequence by the base station 3 from the base station 1), and the detection result of the base station 4 may include $\Delta 1$. In this case, if the base station 3 and the base station 4 are base stations that are in the non-out-of-synchronization state, the first network device calculates, based on $\Delta 1$ and $\Delta 2$, an interstation deviation $(\Delta 1 - \Delta 2)/2$ between the base station 3 and the base station 4.

For each base station that is in the non-out-of-synchronization state, the first network device calculates an interstation deviation between the base station that is in the non-out-of-synchronization state and each neighboring station that is of the base station and from/to which a detection sequence can be received/sent. Then, a clock deviation level of the base station that is in the non-out-of-synchronization state is determined based on a maximum interstation deviation of the base station that is in the non-out-of-synchronization state and a preset clock deviation level standard.

For example, the clock deviation level standard is as follows: An interstation deviation of 3 µs to 5 µs indicates a slight deviation, an interstation deviation of 5 µs to 7 µs indicates a medium deviation, and an interstation deviation greater than 7 µs indicates a heavy deviation.

If a maximum interstation deviation of the base station 3 is the interstation deviation (assuming that the maximum interstation deviation is 6 µs) between the base station 3 and the base station 4, the first network device determines that interstation deviation levels of the base station 3 and the base station 4 are both medium deviations.

According to the clock state detection method provided in this application, a base station with interstation deviations of different degrees can be detected, to perform troubleshooting, warning, and rectification in advance, thereby ensuring normal running of a service of the base station.

It should be noted that, in FIG. 5, four base stations are used as an example for description. A person skilled in the art may understand that a value of M may be 2, 3, or greater than 4. When the value of M is relatively large, for example, when M is greater than 100, big data analysis may be performed based on the M detection results, to determine the clock states of the M base stations more accurately.

According to the method provided in this application, the clock states of the M base stations across an entire network can be analyzed. In addition, the clock states of the M base stations may be detected before mutual interference occurs among the M base stations due to clocknon-synchronization, so as to identify the clock states of the M base stations across the entire network in advance to perform troubleshooting, warning, and rectification in advance, thereby ensuring normal running of services of the base stations and user experience of UE. In addition, according to the method provided in this application, the clock states of the M base stations across the entire network may be obtained through analysis in a relatively short time, so that it is unnecessary to separately determine clock states of interfered base stations one by one, thereby improving efficiency of monitoring the clock states of the base stations.

In addition, the method in FIG. 5 may be performed periodically, so that the clock states of the M base stations across the entire network can be monitored in real time, thereby improving system reliability.

The following separately describes the foregoing three parts by using examples with reference to specific embodiments.

Figure 7:
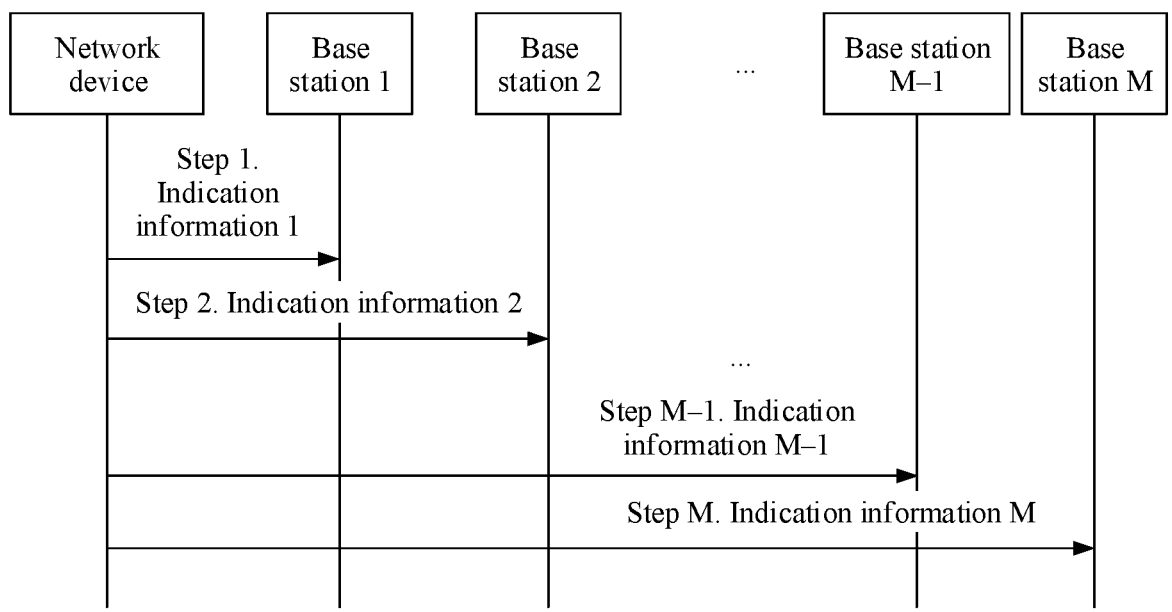
FIG. 7 is a schematic flowchart of sending indication information according to this application.

FIG. 7 focuses on an implementation of the first part (delivery of control information). FIG. 7 may be combined with the content in FIG. 5. An example shown in FIG. 7 is used to further describe step 501 in FIG. 5. As shown in FIG. 7, step 501 includes the following steps:

Step 1. The first network device sends the indication information 1 to the base station 1, where the indication information 1 indicates the $N_1$ first time points at which the $N_1$ neighboring stations of the base station 1 send the detection sequences.

Step 2. The first network device sends the indication information 2 to the base station 2, where the indication information 2 indicates the $N_2$ first time points at which the $N_2$ neighboring stations of the base station 2 send the detection sequences.

The rest may be deduced by analogy.

Step M−1. The first network device sends the indication information M−1 to the base station M−1, where the indication information M−1 indicates the $N_{M-1}$ first time points at which the $N_{M-1}$ neighboring stations send the detection sequences.

Step M. The first network device sends the indication information M to the base station M, where the indication information M indicates the $N_M$ first time points at which the $N_M$ neighboring stations send the detection sequences.

For example, it is assumed that a mechanism for sending a detection sequence by a base station is as follows:

A time during which the M base stations complete air interface detection is a periodicity T. The periodicity T may include several sub-periodicities. Each sub-periodicity may include X radio frames. Frame numbers of several radio frames in one sub-periodicity may be the same as those of radio frames in another sub-periodicity. For example, a sub-periodicity may include 1024 radio frames (10.24 seconds), and frame numbers of the radio frames in each sub-periodicity may be 0 to 1023. J radio frames may be selected from the X radio frames in each sub-periodicity to send detection sequences, and the J radio frames may be consecutive or nonconsecutive radio frames. Each base station may send detection sequences on I radio frames, and the I radio frames may be consecutive or nonconsecutive radio frames, so that a neighboring station of the base station can receive the detection sequence on the I radio frames, thereby avoiding a case in which the detection sequence cannot be received due to poor channel quality of a single radio frame.

The first network device may control the M base stations to separately send detection sequences on different radio frames, or may control at least two base stations that have no same neighboring station in the M base stations to send detection sequences on a same radio frame.

Figure 8:
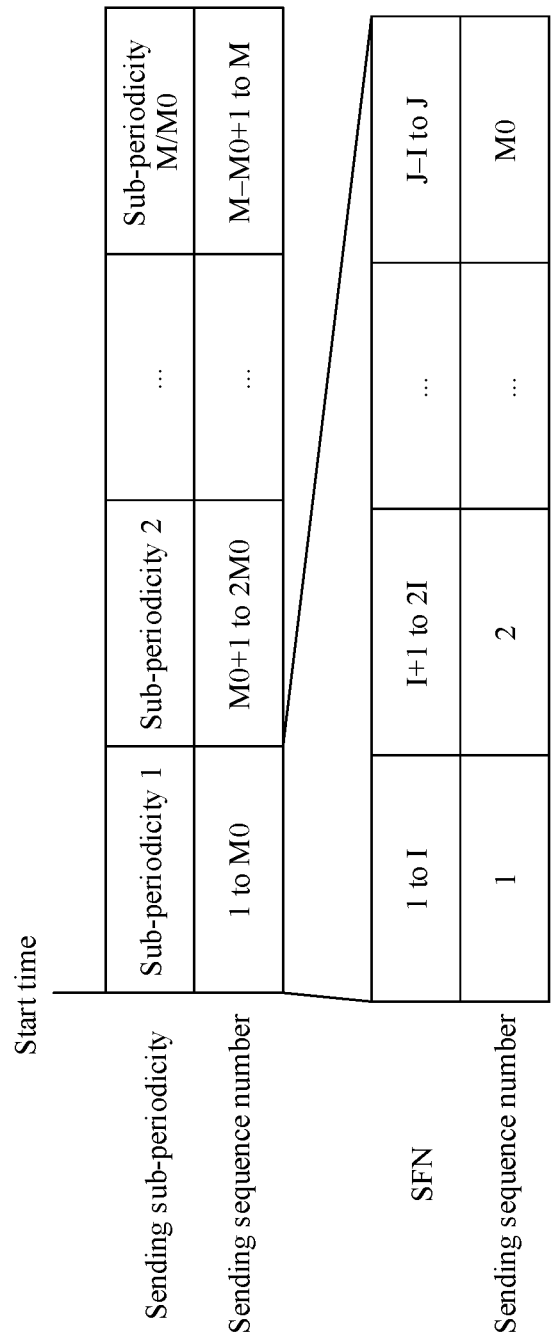
FIG. 8 is a schematic diagram of a mechanism for sending a detection sequence by a base station according to this application.

As shown in FIG. 8, the M base stations separately send the detection sequences on different radio frames. A quantity of base stations that can send a detection sequence in each sub-periodicity is M0=J/I, and the M base stations need M/M0 sub-periodicities to complete sending of a detection sequence once. That is, one periodicity T may include M/M0 sub-periodicities. Base stations with sending numbers of 1 to M0 send detection sequences in a sub-periodicity 1, and base stations with sending numbers of M0+1 to 2M0 send detection sequences in a sub-periodicity 2. By analogy, base stations with sending numbers of M−M0+1 to M send detection sequences in a sub-periodicity M/M0.

An example in which the base stations with the sending numbers of 1 to M0 send the detection sequences in the sub-periodicity 1 is used. The J radio frames may be consecutive or nonconsecutive radio frames. For ease of description herein, an example in which the J radio frames are consecutive radio frames, and system frame numbers (system frame number, SFN) of the J radio frames are 1 to J is used for description.

The base station with the sending number of 1 sends detection sequences on radio frames with SFNs of 1 to I. The base station with the sending number of 2 sends detection sequences on radio frames with SFNs of I+1 to 2I. By analogy, the base station with the sending number of M0 sends detection sequences on radio frame with SFNs of J−I to J.

Based on the foregoing detection sequence sending mechanism, in a possible design, the first network device may directly include, in the indication information, information about the N first time points at which the N neighboring stations of the base station send the detection sequences, and information about the second time point at which the base station sends the detection sequence.

For example, the first network device may include, in the indication information 1, a start time of the sub-periodicity 1, a sub-periodicity and SFNs of radio frames for sending the detection sequences by the base station 1, the base station 2, and the base station 3. For example, the indication information 1 includes a start time of the periodicity T, a sub-periodicity number (the sub-periodicity 1) and SFNs of radio frames (including 1, 2, . . . , and I) for sending the detection sequences by the base station 1, a sub-periodicity number (the sub-periodicity 1) and SFNs of radio frames (including I+1, I+2, . . . , and 2I) for sending the detection sequences by the base station 2, a sub-periodicity ID (the sub-periodicity 1) and SFNs of radio frames (including 2I+1, 2I+2, . . . , and 3I) for sending the detection sequences by the base station 3. After receiving the indication information 1, the base station 1 can directly determine a location of the sub-periodicity 1 based on the start time of the periodicity T in the indication information 1, and determine that the base station 1 sends the detection sequences on the radio frames with the SFNs of 1, 2, . . . , and I in the sub-periodicity 1; the base station 2 sends the detection sequences on the radio frames with the SFNs of I+1, I+2, . . . , and 2I in the sub-periodicity 1; and the base station 3 sends the detection sequences on the radio frames with the SFNs of 2I+1, 2I+2, . . . , and 3I in the sub-periodicity 1.

In another possible design, the first network device may alternatively include, in the indication information, the control information. A base station may calculate, based on the control information, N first time points at which N neighboring stations of the base station send detection sequences, and information about a second time point at which the base station sends a detection sequence. For example, the indication information carries the start time of the periodicity T and sending numbers of the base station and the N neighboring stations of the base station.

For example, the indication information 1 includes the start time of the periodicity T, the sending number of the base station 1 (for example, the sending number of the base station 1 is 1), the sending number of the base station 2 (for example, the sending number of the base station 2 is 2), and the sending number of the base station 3 (for example, the sending number of the base station 3 is 3). After receiving the indication information 1, the base station 1 determines, based on the sending mechanism shown in FIG. 8 and the start time of the periodicity T, locations of the M/M0 sub-periodicities, and then determines, based on the sending number 1 of the base station 1, that the base station 1 sends the detection sequences on the radio frames with the SFNs of 1, 2, . . . , and I in the sub-periodicity 1; determines, based on the sending number 2 of the base station 2, that the base station 2 sends the detection sequences on the radio frames with the SFNs of I+1, I+2, . . . , and 2I in the sub-periodicity 1; and determines, based on the sending number 3 of the base station 3, that the base station 3 sends the detection sequences on the radio frames with the SFNs of 2I+1, 2I+2, . . . , and 3I in the sub-periodicity 1.

Optionally, the indication information may further carry location information indicating a special subframe for sending a detection sequence in a radio frame. For example, the location information may indicate the first special subframe, the second special subframe, or the last special subframe in the radio frame to send the detection sequence. For example, the indication information 1 carries location information indicating the last special subframe in the radio frame. After the base station 1 determines, based on either of the foregoing two possible designs, the radio frames on which the base station 1, the base station 2, and the base station 3 send the detection sequences, the base station 1 further determines, based on the location information, that the base station 1 sends the detection sequence in the last special subframe of each of the radio frames with the SFNs of 1, 2, . . . , and I; that the base station 2 sends the detection sequence in the last special subframe of each of the radio frames with the SFNs of I+1, I+2, . . . , and 2I; and that the base station 3 sends the detection sequence in the last special subframe of each of the radio frames with the SFNs of 2I+1, 2I+2, . . . , and 3I.

Optionally, the indication information further indicates a frequency, and frequencies indicated in the indication information sent by the first network device to the M base stations are the same, thereby ensuring that each base station and each neighboring station of the base station send detection sequences on a same frequency.

Optionally, for the at least two base stations that have no same neighboring station, the first network device may further allocate a same second time point to the at least two base stations that have no same neighboring station. For example, a neighboring station of the base station 2 is the base station 1, and a neighboring station of the base station 4 is the base station 3. The first network device may control both the base station 2 and the base station 4 to send detection sequences in the radio frames with the SFNs of I+1, I+2, . . . , and 2I in the sub-periodicity 1. For example, based on the first possible design, a sub-periodicity number (the sub-periodicity 1) and SFNs of radio frames (including I+1, I+2, . . . , and 2I) for sending the detection sequences by the base station 4 are directly included in the indication information 4 sent to the base station 4 and the indication information 3 sent to the base station 3.

Alternatively, based on the second possible design, the first network device allocates a same sending number, that is, the sending number 2, to the base station 2 and the base station 4. Then, the sending number 2 of the base station 4 is carried in the indication information 4 sent to the base station 4 and the indication information 3 sent to the base station 3. Therefore, the base station 4 and the base station 3 may determine, based on the sending number 2, that the base station 4 also sends the detection sequences in the radio frames with the SFNs of I+1, I+2, . . . , and 2I in the sub-periodicity 1.

The first network device controls the at least two base stations that have no same neighboring station to send the detection sequences at the same second time point, thereby reducing a time for sending the detection sequences by the M base stations, and improving detection efficiency.

For example, the first network device may perform area division based on location information of the M base stations and a coverage radius (that is, a cell radius) of each base station. It is assumed that a radius of a base station with a maximum coverage radius in the M base stations is r, and a distance between two farthest base stations of the M base stations is d. In this case, a central position of the M base stations is used as an origin for annular area division. An area in which the M base stations are located is divided into n=⌈d/r⌉ annular areas, where ⌈ ⌉ represents rounding up. In the n annular areas, cells covered by base stations in non-adjacent annular areas are isolated from each other, that is, the base stations in the non-adjacent annular areas do not have a same neighboring station. Therefore, the network device may control at least two base stations located in the non-adjacent annular areas to send detection sequences at a same time point.

Figure 9:
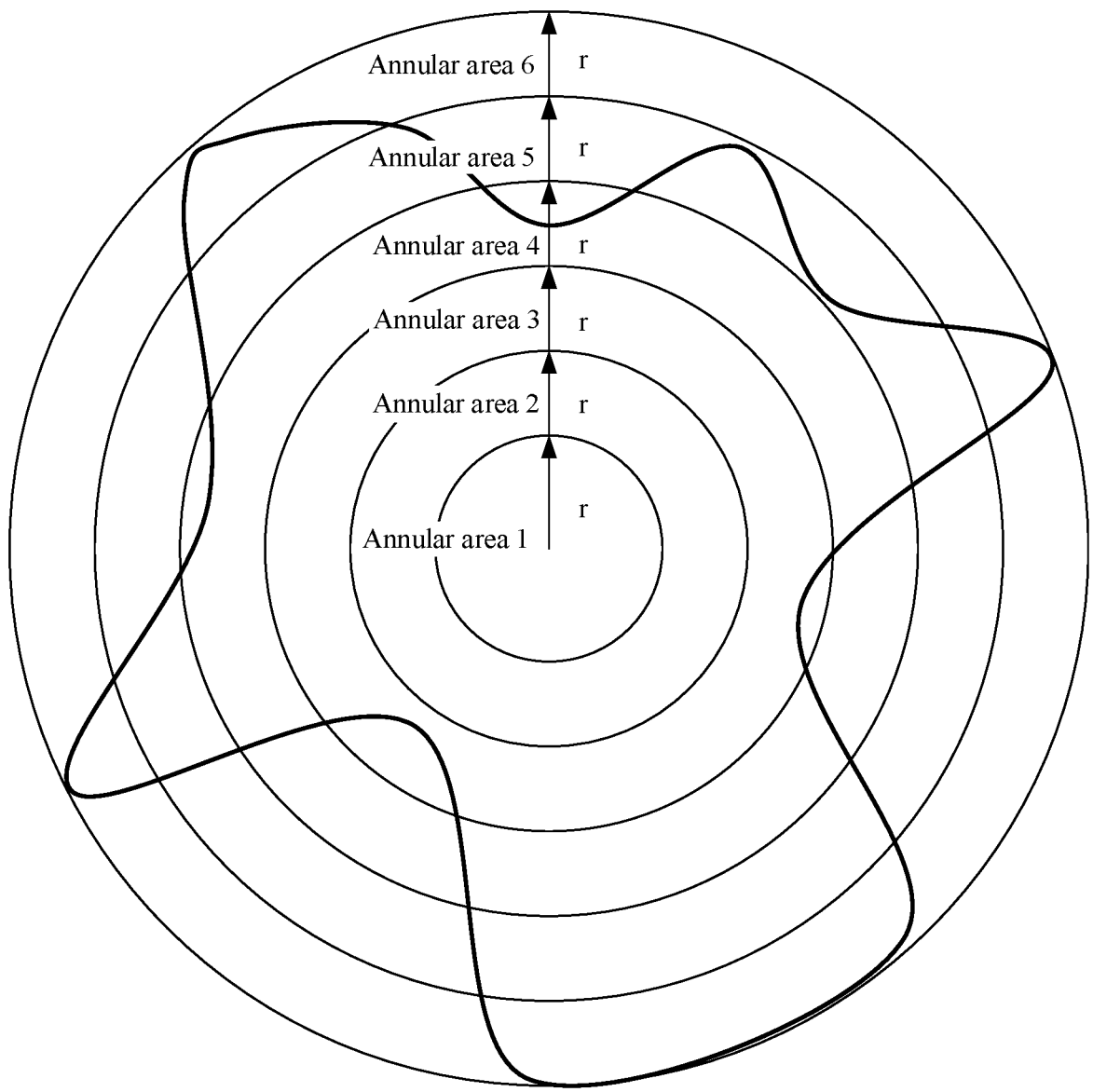
FIG. 9 is a schematic diagram of area division according to this application.

For example, as shown in FIG. 9, areas in which the M base stations are located are divided into six annular areas, where annular areas 1, 3, and 5 are three non-adjacent areas, and annular areas 2, 4, and 6 are three other non-adjacent areas. The first network device may control base stations in the annular areas 1, 3, and 5 to simultaneously send detection sequences, and base stations in the annular areas 2, 4, and 6 to simultaneously send detection sequences. Compared with a manner in which the base stations in the six areas sequentially send the detection sequences, a detection time is reduced by two thirds, thereby improving detection efficiency.

Figure 10:
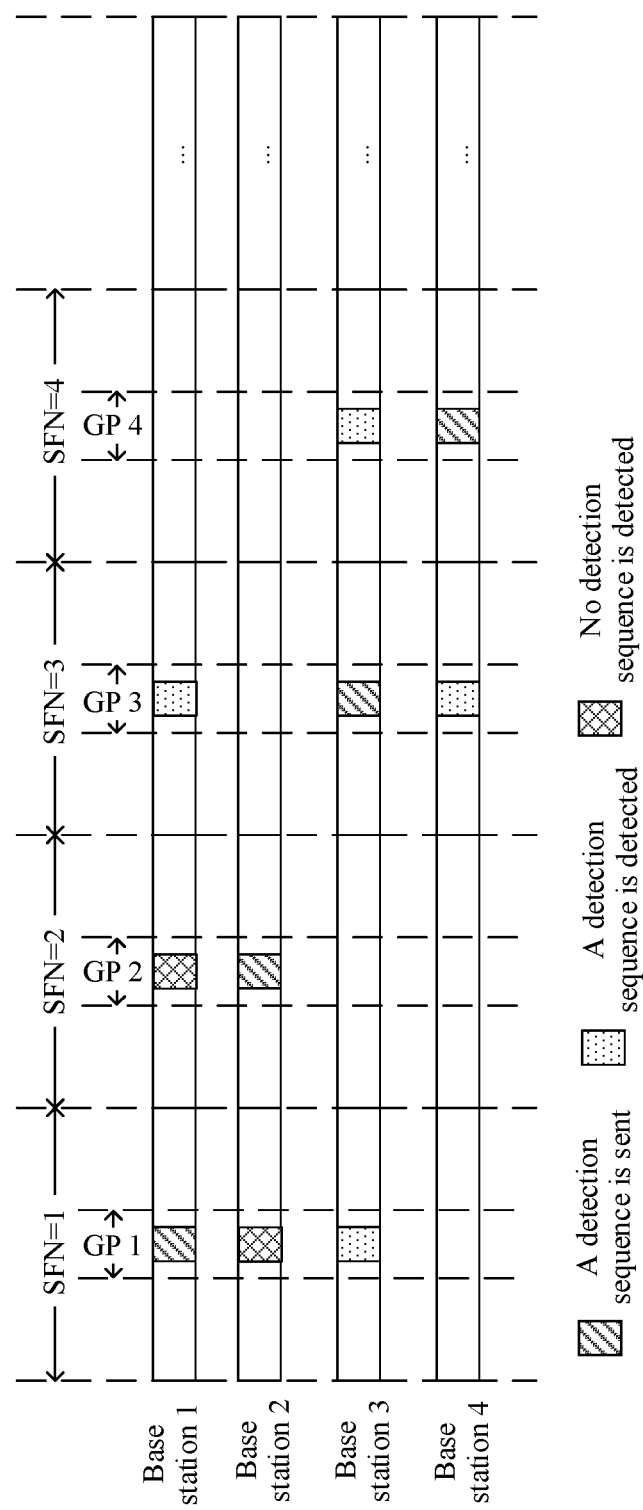
FIG. 10 is a schematic diagram of air interface detection according to this application.

An embodiment shown in FIG. 10 focuses on an implementation of the second part (air interface detection). FIG. 10 may be combined with the content in FIG. 5. An example shown in FIG. 10 is further used to describe step 502 in FIG. 5.

For example, the M base stations are the base station 1, the base station 2, the base station 3, and the base station 4. The base station 1 and the base station 3 are neighboring stations of each other, the base station 1 and the base station 2 are neighboring stations of each other, and the base station 3 and the base station 4 are neighboring stations of each other. As shown in FIG. 10, the first network device controls the base station 1 to send a detection sequence in a GP 1 (it is assumed that the GP 1 is a GP in a special subframe in a radio frame with an SFN of 1), the base station 2 to send a detection sequence in a GP 2 (it is assumed that the GP 2 is a GP in a special subframe in a radio frame with an SFN of 2), the base station 3 to send a detection sequence in a GP 3 (it is assumed that the GP 3 is a GP in a special subframe in a radio frame with an SFN of 3), and the base station 4 to send a detection sequence in a GP 4 (it is assumed that the GP 4 is a GP in a special subframe in a radio frame with an SFN of 4).

The base station 1 sends the detection sequence in the GP 1 based on an indication of the received indication information 1, and detects detection sequences in the GP 2 and the GP 3 to determine whether the detection sequences sent by the base station 2 and the base station 3 can be received. For example, as shown in FIG. 10, the base station 1 does not detect a detection sequence in the GP 2, but detects a detection sequence in the GP 3. A detection result obtained by the base station 1 indicates that the base station 1 receives the detection sequence sent by the base station 3, but does not receive the detection sequence sent by the base station 2.

The base station 2 sends the detection sequence in the GP 2 based on an indication of the received indication information 2, and detects a detection sequence in the GP 1 to determine whether the detection sequence sent by the base station 1 can be received. For example, as shown in FIG. 10, the base station 2 does not detect a detection sequence in the GP 1. A detection result obtained by the base station 2 indicates that the base station 2 does not receive the detection sequence sent by the base station 1.

The base station 3 sends the detection sequence in the GP 3 based on an indication of the received indication information 3, and detects detection sequences in the GP 1 and the GP 4 to determine whether the detection sequences sent by the base station 1 and the base station 4 can be received. For example, as shown in FIG. 10, the base station 3 detects a detection sequence in both the GP 1 and the GP 4. A detection result obtained by the base station 3 indicates that the base station 3 receives the detection sequences sent by the base station 1 and the base station 4.

The base station 4 sends the detection sequence in the GP 4 based on an indication of the received indication information 4, and detects a detection sequence in the GP 3 to determine whether the detection sequence sent by the base station 3 can be received. For example, as shown in FIG. 10, the base station 4 detects a detection sequence in the GP 3. A detection result obtained by the base station 4 indicates that the base station 4 receives the detection sequence sent by the base station 3.

Optionally, a detection result of a base station may be further used to indicate a delay for receiving a detection sequence by the base station. For example, a detection sequence sent by each base station and a manner of sending the detection sequence may be the same, so that each base station that receives a detection sequence may learn of a time point at which a base station that sends the detection sequence starts to send the detection sequence in a GP and a time point at which a signal strength for sending a detection sequence is the highest. The base station that receives the detection sequence may determine a receive delay based on the time point at which the detection sequence starts to be sent and a time point at which the detection sequence starts to be received. Alternatively, the receive delay may be determined based on the sending time point with the highest signal strength and a receiving time with the highest signal strength.

The base station 1 detects the detection sequence in the GP 3, and the base station 1 may determine that a signal strength for sending the detection sequence is the highest at a moment t1 in the GP 3 for the base station 3. In addition, the base station 1 detects that the signal strength for sending the detection sequence is the lowest at a moment t2 in the GP 3. The base station 1 may determine that a receive delay for receiving the detection sequence sent by the base station 3 is t2−t1. The base station 1 may directly include, in the detection result, the receive delay t2−t1 of the detection sequence sent by the base station 3. Therefore, the first network device analyzes, based on the receive delay carried in the detection result of the base station 1, whether an interstation deviation exists in base station 1 and a deviation level.

Figure 11:
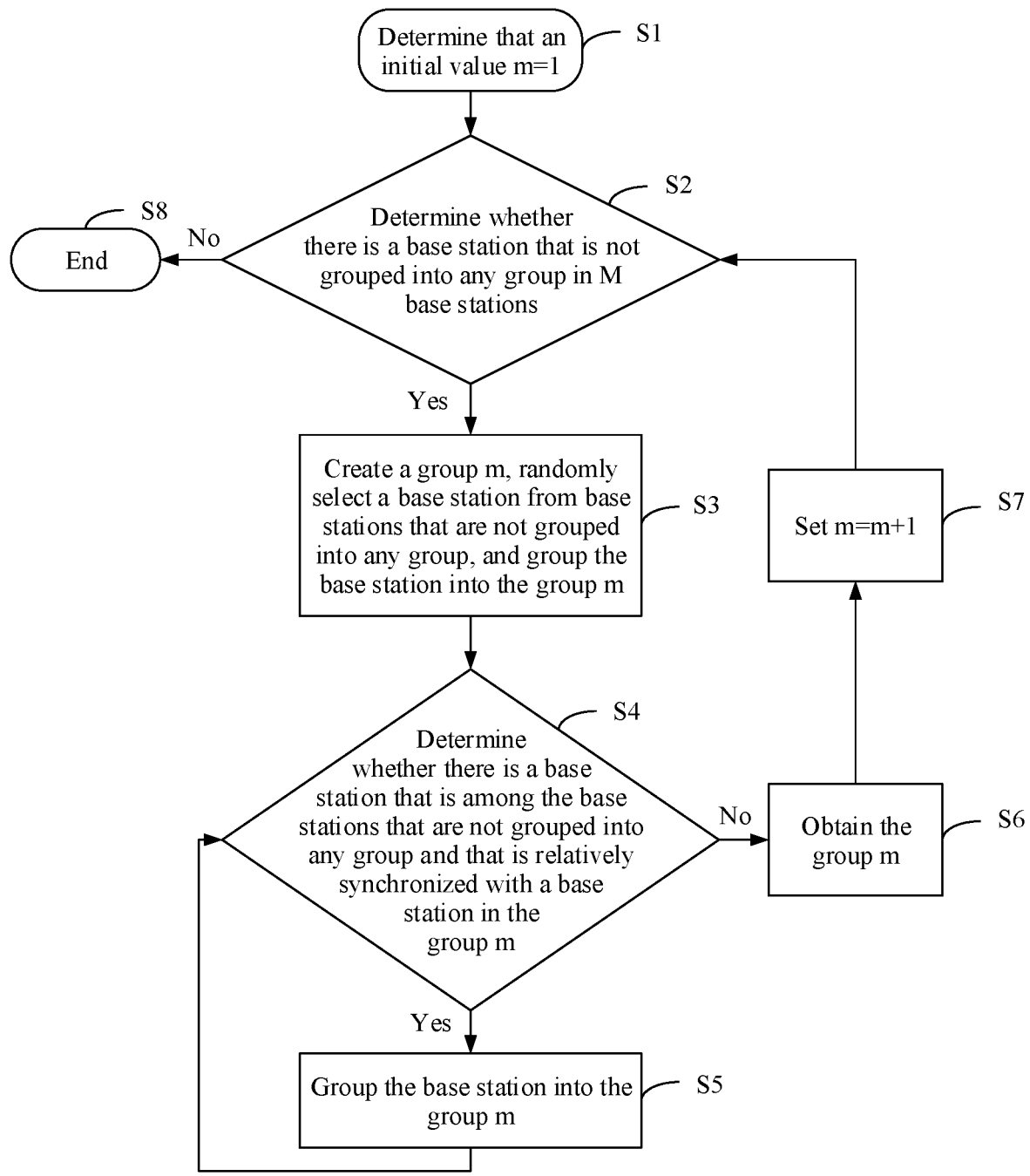
FIG. 11 is a schematic flowchart of a grouping algorithm according to this application.

FIG. 11 describes a grouping algorithm, and relates to an implementation process of the third part (clock state analysis). FIG. 11 may be combined with the content in FIG. 5. An example shown in FIG. 11 is further used to describe step 504 in FIG. 5. As shown in FIG. 11, the grouping algorithm may include the following steps.

S1. Determine that an initial value m=1. The next step is to perform S2.

S2. Determine whether there is a base station that is not grouped into any group in the M base stations. If yes, S3 is performed next; or if not, S8 is performed next.

S3. Create a group m, randomly select a base station from base stations that are not grouped into any group, and group the base station into the group m. S4 is performed next.

S4. Determine whether there is a base station that is among the base stations that are not grouped into any group and that is relatively synchronized with a base station in the group m. If yes, S5 is performed next; or if not, S6 is performed next.

When S4 is performed, if there is no base station that is not grouped into any group, that is, none of the M base stations is grouped into one group, the first network device directly determines that a determining result of S4 is no.

S5. Group the base station into the group m. The next step is to perform S4.

S6. Obtain the group m. The next step is to perform S7.

S7. Set m=m+1. The next step is to perform S2.

S8. End.

Through the foregoing algorithm, the M base stations may be grouped into at least one group. For each of the at least one group, there is no base station outside the group that is relatively synchronized with a base station in the group. In addition, if the group includes at least two base stations, each base station in the group is relatively synchronized with at least one other base station in the group. If a base station in the M base stations does not have a neighboring station that is relatively synchronized with the base station, the base station may form a group independently.

For example, the base station 1, the base station 2, the base station 3, and the base station 4 in the foregoing examples are used as an example. The base station 1 and the base station 3 are neighboring stations of each other, the base station 1 and the base station 2 are neighboring stations of each other, and the base station 3 and the base station 4 are neighboring stations of each other. The first network device determines, based on the detection results sent by the base station 1, the base station 2, the base station 3, and the base station 4, that the base station 1 is not relatively synchronized with the base station 2, the base station 1 is relatively synchronized with the base station 3, and the base station 3 is relatively synchronized with the base station 4.

The first network device determines, starting from S1, that m=1. The next step is to perform S2: Determine whether there is a base station that is not grouped into any group in the four base stations. It is determined that none of the four base stations is grouped into any group. The next step is to perform S3: Create a group 1 (in this case, m=1), randomly select the base station 1 from the base station 1, the base station 2, the base station 3, and the base station 4, and group the base station 1 into the group 1. The next step is to perform S4: Determine whether there is a base station that is among the base station 2, the base station 3, and the base station 4 that are not grouped into any group and that is relatively synchronized with a base station in the group 1. It is determined that the base station 3 is relatively synchronized with the base station 1 in the group 1. The next step is to perform S5: Group the base station 3 into the group 1. In this case, the group 1 includes the base station 1 and the base station 3. The next step is to perform S4: Determine whether there is a base station that is in the base station 2 and the base station 4 that are not grouped into any group and that is relatively synchronized with a base station in the group 1. It is determined that the base station 4 is relatively synchronized with the base station 3 in the group 1. The next step is to perform S5: Group the base station 4 into the group 1. In this case, the group 1 includes the base station 1, the base station 3, and the base station 4. The next step is to perform S4: Determine whether the base station 2 that is not grouped into any group is relatively synchronized with a base station in the group 1. It is determined that the base station 2 is not relatively synchronized with the base station 1 in the group 1. The next step is to perform S6: Obtain the group 1, where the group 1 includes the base station 1, the base station 3, and the base station 4. The next step is to perform S7: Set m=1+1=2. The next step is to perform S2: Determine whether there is a base station that is not grouped into any group in the four base stations. It is determined that the base station 2 is not grouped into any group. The next step is to perform S3: Create a group 2 (in this case, m=1), and group the base station 2 into the group 2. The next step is to perform S4: Determine whether there is a base station that is among base stations that are not grouped into any group and that is relatively synchronized with a base station in group 2. In this case, because there is no base station that is not grouped into any group, a determining result of S4 is determined as no. The next step is to perform S6: Obtain the group 2, where the group 2 includes the base station 2. The next step is to perform S7: Set m=2+1=3. The next step is to perform S2: Determine whether there is a base station that is not grouped into any group in the four base stations. It is determined that there is no base station that is not grouped into any group. The next step is to perform S8: End.

After S8 is performed, the four base stations are grouped into two groups, including the group 1 and the group 2. The group 1 includes the base station 1, the base station 3, and the base station 4. Each base station in the group 1 has a base station that is relatively synchronized with the base station in the group 1 (for example, the base station 1 is relatively synchronized with the base station 3, and the base station 4 is relatively synchronized with the base station 3). In addition, each base station in the group 1 is not relatively synchronized with any other base station outside the group 1 (for example, the base station 1 has a neighboring station outside the group 1, that is, the base station 2, but the base station 2 is not relatively synchronized with the base station 1).

The group 2 includes the base station 2, and the base station 2 does not have a neighboring station that is relatively synchronized with the base station 2. Therefore, the base station 2 forms a group independently.

Based on the foregoing algorithm, the first network device may group the M base stations into the at least one group, and then determine, according to a majority vote rule, a group, in the at least one group, including base stations whose quantity is greater than or equal to a preset threshold as a synchronization group, or when a quantity of base stations included in each of the at least one group is less than the threshold, determine a group, in the at least one group, including a largest quantity of base stations as the synchronization group, where a clock state of each base station in the synchronization group is a synchronization state.

After determining the base stations whose clock states are the synchronization state in the M base stations, the first network device further determines, based on the out-of-synchronization condition, the base stations whose clock states are the out-of-synchronization state. Specifically, for a specific manner in which the first network device determines, based on the out-of-synchronization condition, the base stations whose clock states are the out-of-synchronization state, refer to related descriptions in the 504. Details are not described herein again. After determining the base stations whose clock states are the out-of-synchronization state in the M base stations, the first network device may further determine whether an interstation deviation exists between the base stations that are in the non-out-of-synchronization state. Specifically, for a specific manner in which the first network device detects an interstation deviation based on a detection result of a base station, refer to related descriptions in step 504. Details are not described herein again.

After determining the clock states of the M base stations, the first network device may check a cause of out-of-synchronization for a base station in the out-of-synchronization state, and further perform rectification.

For example, if an internal clock system of the base station in the out-of-synchronization state is not faulty, it may be determined whether a clock source or a transmission device that sends a clock signal to the base station in the out-of-synchronization state is faulty. The transmission device may be a device, such as a switch or a router, configured to perform clock signal transmission between a base station and a clock source.

For example, if all base stations of a same clock source are base stations whose clock states are the out-of-synchronization state, the first network device determines that the clock source is faulty.

One clock source may send clock signals to a plurality of base stations, so that the plurality of base stations each adjust a time of an internal clock system based on the clock signal. If all base stations of one clock source are out of synchronization, it is highly possible that the clock source is faulty and consequently delivers an incorrect clock signal.

For example, if there is only one base station, namely, the base station 2, of one clock source, and the first network device determines that a clock state of the base station 2 is the out-of-synchronization state, the first network device may determine that the clock source is faulty.

For example, if all base stations served by a same transmission device are base stations whose clock states are the out-of-synchronization state, the first network device determines that the transmission device is faulty.

One clock source may require a plurality of transmission devices to send clock signals of the clock source to different base stations. When all base stations served by a transmission device are out of synchronization, and base stations served by other transmission devices that forward a same clock signal with the transmission device are not out of synchronization, it is highly possible that the transmission device is faulty and consequently forwards an incorrect clock signal, leading to a case in which all the base stations served by the transmission device are out of synchronization.

For example, clock sources of the base station 1 and the base station 2 are the same. The base station 1 receives a clock signal delivered by a transmission device 1, while the base station 2 receives a clock signal delivered by a transmission device 2. The transmission device 2 delivers the clock signal only to the base station 2. If the clock state of the base station 2 is the out-of-synchronization state and the clock state of the base station 1 is the synchronization state, it indicates that the clock source is normal, but the transmission device 2 that delivers the clock signal to the base station 2 is faulty.

If some base stations served by a same transmission device are all base stations whose clock states are the out-of-synchronization state, the first network device determines that the some base stations are faulty, or that ports on the transmission device that are connected to the some base stations are faulty.

One transmission device may deliver clock signals of a clock source to a plurality of different base stations. When clock states of some base stations served by a transmission device are the out-of-synchronization state, and clock states of the other base stations served by the transmission device are the synchronization state, a possible cause is that the some base stations receive incorrect clock signals. For example, ports on the transmission device that are connected to the some base stations are faulty, and consequently clock signals delivered from these ports are incorrect, leading to a case in which the some base stations are out of synchronization. Alternatively, the transmission device delivers normal clock signals, but the some base stations are faulty and cannot correctly process the clock signals, leading to a case in which the some base stations are out of synchronization.

For example, both the base station 1 and the base station 2 receive clock signals delivered by the transmission device 1. If the clock state of the base station 2 is the out-of-synchronization state and the clock state of the base station 1 is the synchronization state, it indicates that a port on the transmission device 1 that is connected to the base station 2 may be faulty, or the base station 2 may be faulty.

Optionally, after determining that the clock source is faulty, the first network device may further perform a related maintenance operation. For example, when there is a standby clock source, the faulty clock source is replaced by the standby clock source; or when there is no standby clock source, all base stations of the faulty clock source are disabled.

The foregoing uses an example in which the first network device performs the first part of the solutions of this application, that is, delivery of control information, the M base stations perform the second part of the solutions of this application, that is, air interface detection, and the first network device performs the third part of the solutions of this application, that is, clock state analysis, for description. The solutions of this application may alternatively be performed by another device.

For example, a second network device performs the first part of the solutions of this application; the M base stations perform the second part of the solutions of this application; and the first network device performs the third part of the solutions of this application.

Figure 12:
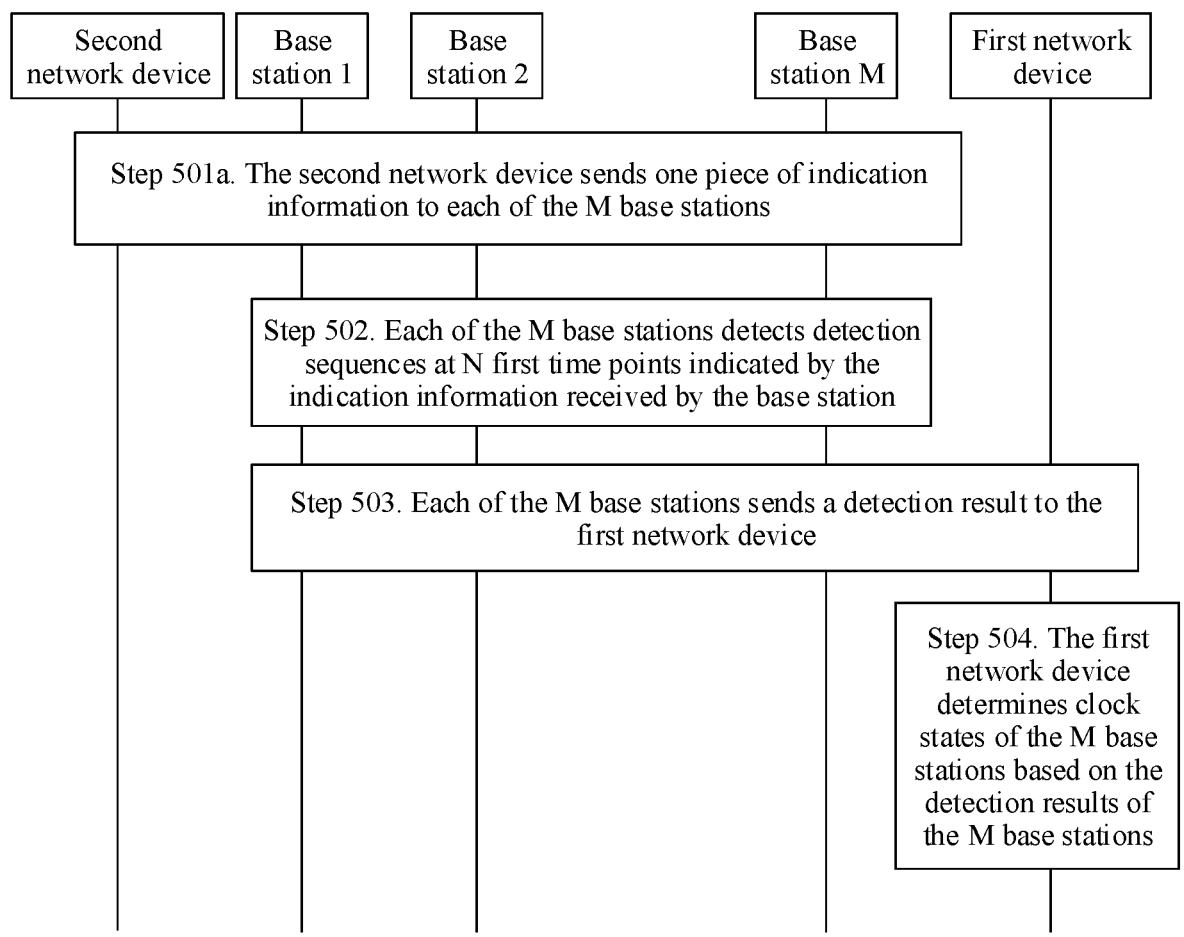
FIG. 12 is a schematic flowchart of another embodiment of a clock state detection method according to this application.

For example, based on FIG. 5, as shown in FIG. 12, step 501 may be replaced with the following step:

Step 501*a*. The second network device sends one piece of indication information to each of the M base stations.

Alternatively, the first network device performs the first part of the solutions of this application; the M base stations perform the second part of the solutions of this application; and the first network device cooperates with the second network device to perform the third part of the solutions of this application.

Figure 13:
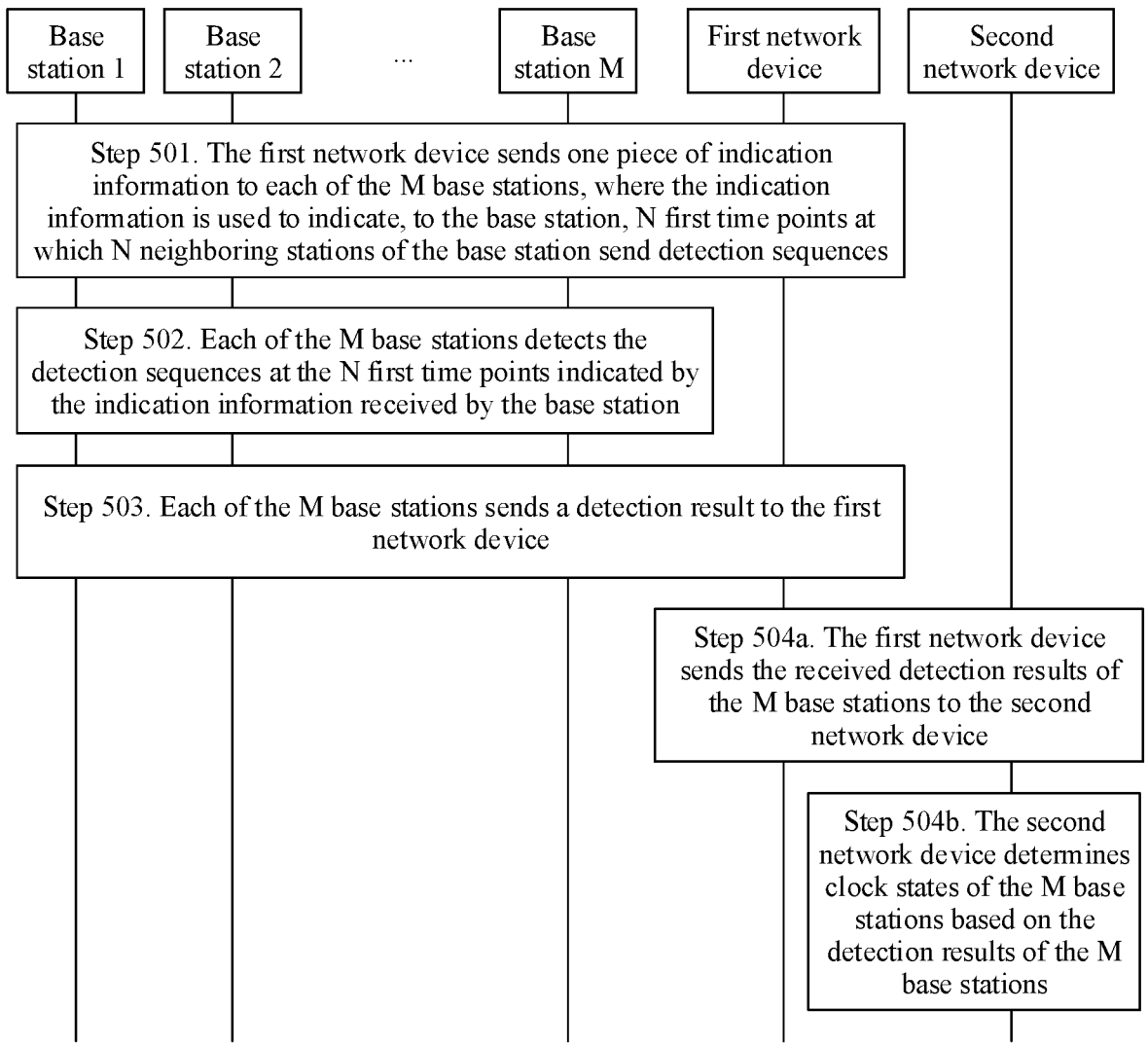
FIG. 13 is a schematic flowchart of still another embodiment of a clock state detection method according to this application.

For example, based on FIG. 5, as shown in FIG. 13, step 504 may be replaced with the following steps:

Step 504*a*. The first network device sends the received detection results of the M base stations to the second network device.

Step 504*b*. The second network device determines the clock states of the M base stations based on the detection results of the M base stations.

Alternatively, one of the M base stations performs the first part and the third part of the solutions of this application; and the M base stations perform the second part of the solutions of this application.

Figure 14:
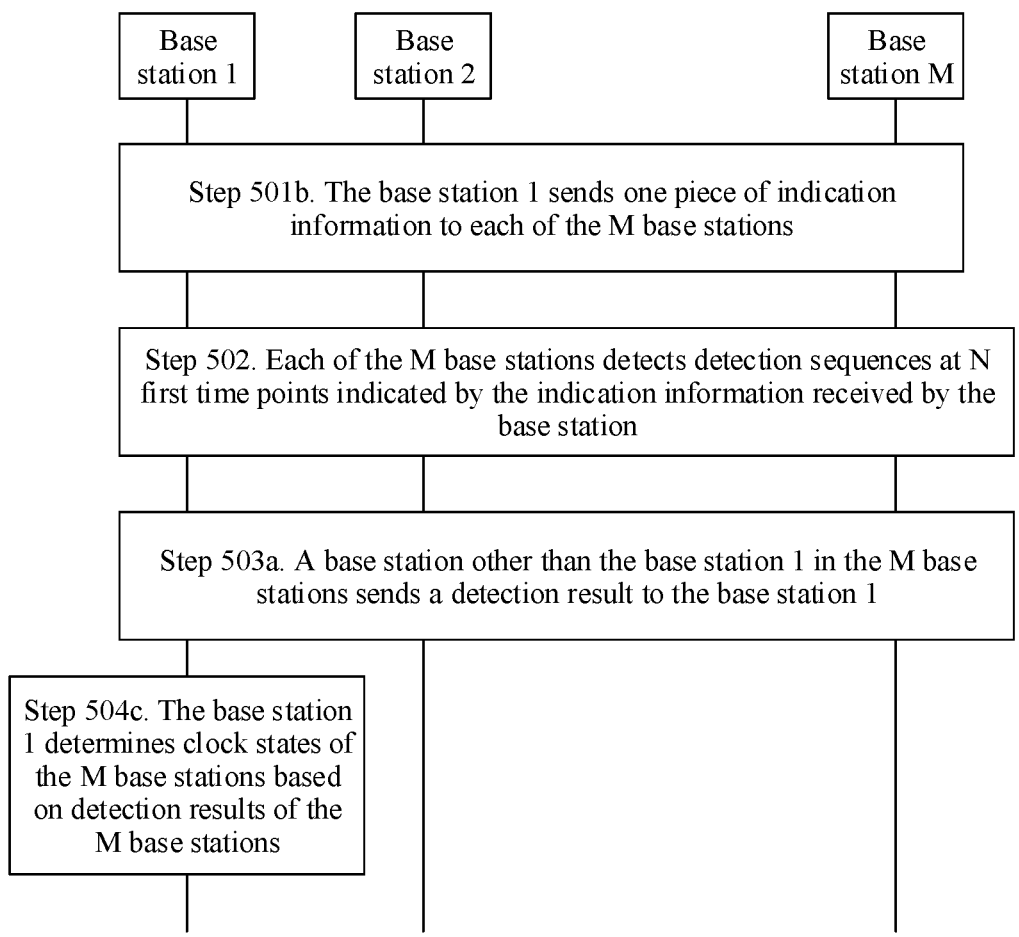
FIG. 14 is a schematic flowchart of still another embodiment of a clock state detection method according to this application.

For example, the base station 1 is used as an example. Based on FIG. 5, as shown in FIG. 14, step 501 may be replaced with the following step:

Step 501*b*. The base station 1 sends one piece of indication information to each of the M base stations.

Step 503 may be replaced with the following step:

Step 503*a*. A base station other than the base station 1 in the M base stations sends the detection result to the base station 1.

Step 504 may be replaced with the following step:

Step 504*c*. The base station 1 determines the clock states of the M base stations based on the detection results of the M base stations.

According to the method provided in this application, the clock states of the M base stations across an entire network can be analyzed. In addition, the clock states of the M base stations may be detected before mutual interference occurs among the M base stations due to clocknon-synchronization, so as to identify the clock states of the M base stations across the entire network in advance to perform troubleshooting, warning, and rectification in advance, thereby ensuring normal running of services of the base stations and user experience of UE. In addition, according to the method provided in this application, the clock states of the M base stations across the entire network may be obtained through analysis in a relatively short time, so that it is unnecessary to separately determine clock states of interfered base stations one by one, thereby improving efficiency of monitoring the clock states of the base stations.

Figure 15:
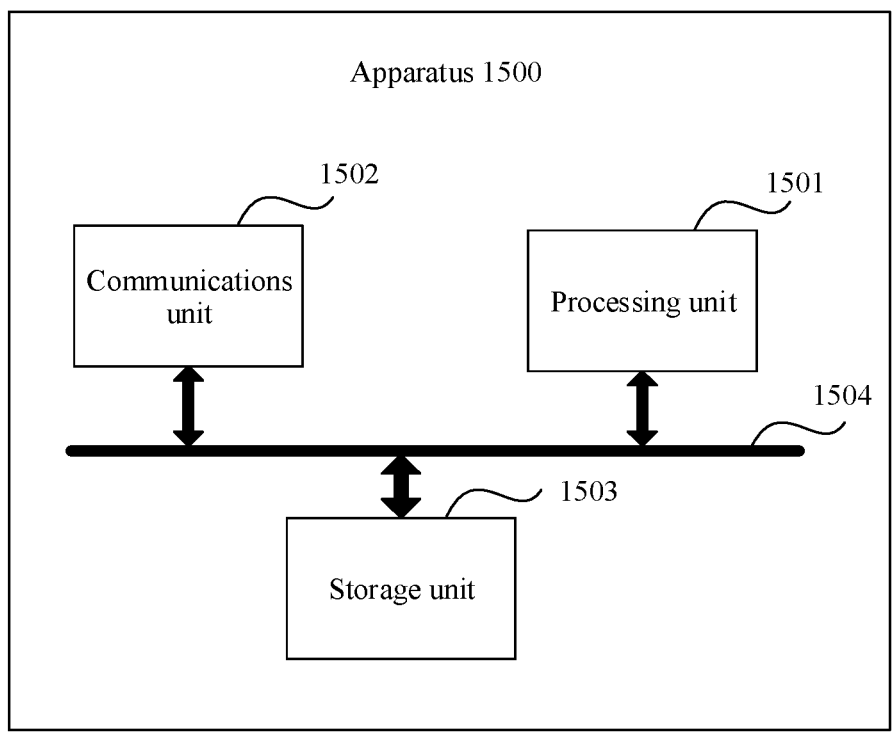
FIG. 15 is a schematic structural diagram of an apparatus according to this application.

The following describes an apparatus provided in an embodiment of this application. As shown in FIG. 15, the apparatus 1500 includes a processing unit 1501 and a communications unit 1502.

Optionally, the apparatus further includes a storage unit 1503. The processing unit 1501, the communications unit 1502, and the storage unit 1503 are connected by using a communications bus 1504.

The communications unit 1502 may be an apparatus that has a transceiver function, and is configured to communicate with another network device, a base station, or a communications network.

The storage unit 1503 may include one or more memories. The memory may be a component configured to store a program or data in one or more devices or circuits.

The storage unit 1503 may exist independently, and is connected to the processing unit 1501 by using the communications bus 1504. The storage unit 1503 may alternatively be integrated together with the processing unit 1501.

The apparatus 1500 may be used in a base station, a network device, a circuit, a hardware component, or a chip.

The apparatus 1500 may be a base station in the embodiments of this application, for example, the base station 1, the base station 2, the base station 3, the base station 4, . . . , or the base station M. A schematic diagram of the base station may be shown in FIG. 2. Optionally, the communications unit 1502 of the apparatus 1500 may include an antenna, a transceiver, and a network interface of the base station, for example, the antenna 205, the transceiver 203, and the network interface 204 in FIG. 2.

The apparatus 1500 may be a chip in the base station in the embodiments of this application, for example, a chip in a base station 121. The communications unit 1502 may be an input or output interface, a pin, a circuit, or the like. Optionally, the storage unit 1503 may store a computer-executable instruction of a method on the base station side, so that the processing unit 1501 performs the method performed by the base station in the foregoing embodiments. For example, with reference to the method procedure shown in FIG. 14, the processing unit 1501 is configured to control the communications unit 1502 to deliver M pieces of indication information to M base stations, and is further configured to control the communications unit 1502 to send a detection sequence and detect detection sequences at first time points at which N neighboring stations send the detection sequences, control the communications unit 1502 to send a detection result, and determine clock states of the M base stations based on detection results of the M base stations. For a specific process, refer to descriptions of related content in the embodiments shown in FIG. 14 and FIG. 5. For example, with reference to the method procedure shown in FIG. 5, the processing unit 1501 is configured to control the communications unit 1502 to send a detection sequence and detect detection sequences at first time points at which N neighboring stations send the detection sequences, and is further configured to control the communications unit 1502 to send a detection result. For a specific process, refer to descriptions of related content in the embodiment shown in FIG. 5. The storage unit 1503 may be a register, a cache, a RAM, or the like. The storage unit 1503 may be integrated with the processing unit 1501. The storage unit 1503 may be a ROM or another type of static storage device that can store static information and an instruction. The storage unit 1503 may be independent of the processing unit 1501. Optionally, with development of wireless communications technologies, a transceiver and a network interface may be integrated into the apparatus 1500. For example, the communications unit 1502 integrates the transceiver 203 and the network interface 204.

When the apparatus 1500 is the base station or the chip in the base station in the embodiments of this application, the apparatus 1500 may implement the method performed by the base station in the foregoing embodiments. For example, the processing unit 1501 receives indication information, receives/transmits a detection sequence, and sends a detection result by using the communications unit 1502. For details, refer to related content in steps 501 to 504 in FIG. 5. Optionally, the processing unit 1501 may further send the M pieces of indication information to the M base stations by using the communications unit 1502. For details, refer to related content in step 501b in FIG. 14. Optionally, the processing unit 1501 may further receive, by using the communications unit 1502, the detection results sent by the M base stations, and determine the clock states of the M base stations. For details, refer to related content in steps 503 and 504c in FIG. 14. Details are not described herein again.

The apparatus 1500 may be the network device in the embodiments of this application, for example, the first network device or the second network device. A schematic diagram of the network device may be shown in FIG. 3. Optionally, the communications unit 1502 of the apparatus 1500 may include a network interface of the network device, for example, the network interface 303 in FIG. 3.

The apparatus 1500 may be a chip in the network device in the embodiments of this application, for example, a chip in the first network device or the second network device. The communications unit 1502 may be an input or output interface, a pin, a circuit, or the like. Optionally, the storage unit 1503 may store a computer-executable instruction of a method on the network device side, so that the processing unit 1501 performs the method on the network device side in the foregoing embodiments. For example, the processing unit 1501 performs the first part, that is, delivery of control information, and the third part, that is, clock state analysis, in the foregoing method embodiment. For details, refer to related content in steps 501, 503, and 504 in FIG. 5. Details are not described herein again.

The storage unit 1503 may be a register, a cache, a RAM, or the like. The storage unit 1503 may be integrated with the processing unit 1501. The storage unit 1503 may be a ROM or another type of static storage device that can store static information and an instruction. The storage unit 1503 may be independent of the processing unit 1501.

When the apparatus 1500 is the network device or the chip in the network device in the embodiments of this application, the method performed by the network device in the foregoing embodiments may be implemented. The processing unit 1501 may send the M pieces of indication information to the M base stations by using the communications unit 1502. For details, refer to related content in step 501 in FIG. 5. Optionally, the processing unit 1501 may further receive the detection results of the M base stations by using the communications unit 1502. For details, refer to related content in step 503 in FIG. 5. Optionally, the processing unit 1501 may further determine the clock states of the M base stations based on the detection results of the M base stations. For details, refer to related content in step 504 in FIG. 5. The apparatus 1500 may further implement another method performed on the network device side, for example, an out-of-synchronization cause check and maintenance.

An embodiment of this application further provides a computer-readable storage medium. The method described in the foregoing embodiments may be all or partially implemented by using software, hardware, firmware, or any combination thereof. If the method is implemented by using software, the functions may be stored in or transmitted on the computer-readable medium as one or more instructions or code. The computer-readable medium may include a computer storage medium and a communications medium, and may further include any medium that can transfer a computer program from one place to another place. The storage medium may be any available medium accessible to a computer.

In an optional design, the computer-readable medium may include a RAM, a ROM, an EEPROM, or a CD-ROM, another optical disc storage, a magnetic disk storage or another magnetic storage device, or any other medium that can be configured to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL, or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc, where the magnetic disks usually magnetically reproduce data, and the optical discs optically reproduce data by using laser light. The foregoing combination should also be included within the scope of the computer-readable medium.

An embodiment of this application further provides a computer program product. The method described in the foregoing embodiments may be all or partially implemented by using software, hardware, firmware, or any combination thereof. When the method is implemented by using software, the method may be all or partially implemented in a form of a computer program product. The computer program product includes one or more computer instructions. When the foregoing computer program instruction is loaded and executed on a computer, the procedures or the functions described in the foregoing method embodiments are all or partially generated. The computer may be a general-purpose computer, a dedicated computer, a computer network, a network device, user equipment, or other programmable apparatuses.

The objectives, the technical solutions, and the beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, improvement, or the like made based on the technical solutions of the present invention shall fall within the protection scope of the present invention.

What is claimed is:

1. An apparatus, comprising at least one processor and a memory coupled to the at least one processor and storing programming instructions for execution by the at least one processor, wherein the programming instructions instruct the at least one processor to perform operations comprising:
    sending one piece of indication information to each of M base stations, wherein the indication information is used to indicate, to the base station, N first time points at which N neighboring stations of the base station send detection sequences;
    receiving detection results of the M base stations, wherein the detection result of each of the M base stations is used to indicate whether the base station receives a detection sequence sent by each of its N neighboring stations, wherein the N neighboring stations of each of the M base stations are from the M base stations, both M and N are integers, M is greater than or equal to 2, N is greater than or equal to 1, and N is less than M; and
    determining clock states of the M base stations based on the detection results of the M base stations.

2. The apparatus according to claim 1, wherein the detection result of each of the M base stations is further used to indicate whether, for each of the N neighboring stations, when the base station detects the detection sequence at the first time point at which the neighboring station sends the detection sequence, the base station receives the detection sequence from the neighboring station.

3. The apparatus according to claim 2, wherein the first time point is a first special subframe.

4. The apparatus according to claim 2, wherein the indication information is further used to indicate a second time point at which the base station sends a detection sequence.

5. The apparatus according to claim 4, wherein second time points of at least two base stations that have no same neighboring station in the M base stations are the same.

6. The apparatus according to claim 4, wherein the second time point is a second special subframe.

7. The apparatus according to claim 1, wherein time division duplex (TDD) configurations of the M base stations are the same.

8. The apparatus according to claim 1, wherein the detection result of each of the M base stations is further used to indicate a delay in receiving, by the base station, the detection sequence sent by each of the N neighboring stations of the base station.

9. The apparatus according to claim 1, wherein uplink transmission of each of the M base stations is not interfered with by downlink transmission of the N neighboring stations of the base station.

10. The apparatus according to claim 1, wherein the determining clock states of the M base stations based on the detection results of the M base stations comprises:
    grouping the M base stations into at least one group based on the detection results of the M base stations, wherein for each of the at least one group, if the group comprises at least two base stations, each base station in the group receives a detection sequence sent by at least one other base station in the group, or a detection sequence sent by each base station in the group is received by at least one other base station in the group; and if the group comprises one base station, the one base station does not receive a detection sequence sent by each neighboring station of the one base station, or a detection sequence sent by the one base station is not received by any neighboring station of the one base station; and
    determining a group, in the at least one group, comprising base stations whose quantity is greater than or equal to a preset threshold as a synchronization group, or when a quantity of base stations comprised in all groups in the at least one group is less than the threshold, determining a group, in the at least one group, comprising a largest quantity of base stations as the synchronization group, wherein a clock state of each base station in the synchronization group is a synchronization state.

11. The apparatus according to claim 10, wherein the determining clock states of the M base stations based on the detection results of the M base stations further comprises:
    determining, based on an out-of-synchronization condition, whether an out-of-synchronization group other than the synchronization group exists in the at least one group, wherein a clock state of each base station in the out-of-synchronization group is an out-of-synchronization state.

12. The apparatus according to claim 11, wherein the determining, based on an out-of-synchronization condition, whether an out-of-synchronization group other than the synchronization group exists in the at least one group comprises:
    for any group other than the synchronization group in the at least one group, if one base station in the group meets the out-of-synchronization condition, the group is an out-of-synchronization group, wherein the out-of-synchronization condition comprises one or more of the following conditions:
1) A clock system adjustment value of the one base station is greater than a preset adjustment threshold;
2) the one base station launches a clock alarm; or
3) out-of-synchronization interference to a neighboring station of the one base station is greater than a preset interference threshold, and after the one base station is silent, the out-of-synchronization interference to the neighboring station of the one base station disappears; or out-of-synchronization interference to the one base station is greater than a preset interference threshold, and after a neighboring station of the one base station is silent, the out-of-synchronization interference to the one base station disappears.

13. The apparatus according to claim 12, wherein if the group comprises at least two base stations, the out-of-synchronization condition further comprises:
4) the at least two base stations obtain clock signals from a same clock device.

14. The apparatus according to claim 10, wherein the programming instructions further instruct the at least one processor to perform operations comprising:
if all base stations of a same clock source are base stations whose clock states are the out-of-synchronization state, determining that the clock source is faulty;
if all base stations served by a same transmission device are base stations whose clock states are the out-of-synchronization state, determining that the transmission device is faulty; or
if some base stations served by a same transmission device are all base stations whose clock states are the out-of-synchronization state, determining that the some base stations are faulty, or that ports on the transmission device that are connected to the some base stations are faulty.

15. A clock state detection method, wherein the method comprises:
receiving, by each base station of M base stations, indication information, wherein the indication information is used to indicate N first time points at which N neighboring stations of the base station sequentially send detection sequences, M is greater than or equal to 2, N is an integer greater than or equal to 1, and N is less than M;
detecting, by each base station of the M base stations, the detection sequences at the N first time points, wherein for each of the N neighboring stations, when the base station detects the detection sequence at the first time point at which the neighboring station sends the detection sequence, the base station determines that the detection sequence from the neighboring station is received;
sending, by each base station of the M base stations to an apparatus, a detection result, wherein the detection result is used to indicate whether the base station receives the detection sequence sent by each of the N neighboring stations, to determine a clock state of the base station;
receiving, by the apparatus, detection results of the M base stations, wherein the detection result of each of the M base stations is used to indicate whether the base station receives a detection sequence sent by each of its N neighboring stations, wherein the N neighboring stations of each of the M base stations are from the M base stations; and
determining, by the apparatus, clock states of the M base stations based on the detection results of the M base stations.

16. The method according to claim 15, wherein the method further comprises:
sending, by the apparatus, one piece of indication information to each of the M base stations, wherein the indication information is used to indicate, to the base station, N first time points at which the N neighboring stations of the base station send the detection sequences, and for each of the N neighboring stations, when the base station detects the detection sequence at the first time point at which the neighboring station sends the detection sequence, the base station receives the detection sequence from the neighboring station.

17. The method according to claim 15, wherein the detection result of each of the M base stations is further used to indicate a delay in receiving, by the base station, the detection sequence sent by each of the N neighboring stations of the base station.

18. The method according to claim 15, wherein the determining clock states of the M base stations based on the detection results of the M base stations comprises:
grouping the M base stations into at least one group based on the detection results of the M base stations, wherein for each of the at least one group, if the group comprises at least two base stations, each base station in the group receives a detection sequence sent by at least one other base station in the group, or a detection sequence sent by each base station in the group is received by at least one other base station in the group; and if the group comprises one base station, the one base station does not receive a detection sequence sent by each neighboring station of the one base station, or a detection sequence sent by the one base station is not received by any neighboring station of the one base station; and
determining a group, in the at least one group, comprising base stations whose quantity is greater than or equal to a preset threshold as a synchronization group, or when a quantity of base stations comprised in all groups in the at least one group is less than the threshold, determining a group, in the at least one group, comprising a largest quantity of base stations as the synchronization group, wherein a clock state of each base station in the synchronization group is a synchronization state.

19. The method according to claim 18, wherein the determining clock states of the M base stations based on the detection results of the M base stations further comprises:
determining, based on an out-of-synchronization condition, whether an out-of-synchronization group other than the synchronization group exists in the at least one group, wherein a clock state of each base station in the out-of-synchronization group is an out-of-synchronization state.

20. The method according to claim 19, wherein the determining, based on an out-of-synchronization condition, whether an out-of-synchronization group other than the synchronization group exists in the at least one group comprises:
for any group other than the synchronization group in the at least one group, if one base station in the group meets the out-of-synchronization condition, the group is an out-of-synchronization group, wherein the out-of-synchronization condition comprises one or more of the following conditions:

1) a clock system adjustment value of the one base station is greater than a preset adjustment threshold;
2) the one base station launches a clock alarm; or
3) out-of-synchronization interference to a neighboring station of the one base station is greater than a preset interference threshold, and after the one base station is silent, the out-of-synchronization interference to the neighboring station of the one base station disappears; or out-of-synchronization interference to the one base station is greater than a preset interference threshold, and after a neighboring station of the one base station is silent, the out-of-synchronization interference to the one base station disappears.

* * * * *